US012412546B2

(12) United States Patent
Marchya et al.

(10) Patent No.: US 12,412,546 B2
(45) Date of Patent: Sep. 9, 2025

(54) DISPLAY PROCESSING UNIT PIXEL RATE BASED ON DISPLAY REGION OF INTEREST GEOMETRY

(71) Applicant: QUALCOMM Incorporated, San Diego, CA (US)

(72) Inventors: Dileep Marchya, Hyderabad (IN); Padmanabhan Komanduru, V, Hyderabad (IN); Srinivas Pullakavi, Kakinada (IN)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 18/057,750

(22) Filed: Nov. 21, 2022

(65) Prior Publication Data

US 2024/0169953 A1 May 23, 2024

(51) Int. Cl.
*G09G 5/00* (2006.01)
*G09G 5/393* (2006.01)
*G09G 5/395* (2006.01)

(52) U.S. Cl.
CPC ............. *G09G 5/006* (2013.01); *G09G 5/393* (2013.01); *G09G 5/395* (2013.01);
(Continued)

(58) Field of Classification Search
CPC ........ G09G 5/006; G09G 5/393; G09G 5/395; G09G 2310/04; G09G 2330/021;
(Continued)

(56) References Cited

U.S. PATENT DOCUMENTS 10,049,625 B1 8/2018 Shanmugasundaram et al.
2014/0184611 A1* 7/2014 Wyatt ...................... G09G 3/36 345/501

(Continued)

FOREIGN PATENT DOCUMENTS

WO 2018026423 2/2018
WO 2019212907 A1 11/2019

OTHER PUBLICATIONS

International Search Report and Written Opinion—PCT/US2023/035849—ISA/EPO—Feb. 21, 2024.

*Primary Examiner* — Kwang-Su Yang
(74) *Attorney, Agent, or Firm* — Procopio, Cory, Hargreaves & Savitch LLP

(57) ABSTRACT

Aspects presented herein relate to methods and devices for display processing including an apparatus, e.g., a CPU. The apparatus may perform a partial frame update for a first frame at a first update time, where the partial frame update corresponds to an update of less than all content in the first frame, where the partial frame update for the first frame is associated with a panel ROI of the first frame. The apparatus may also calculate a margin time period between the first update time and a subsequent Vsync time. Further, the apparatus may transmit, based on the margin time period, a first indication of a subsequent frame transfer interrupt time. The apparatus may also transmit, to a DPU, a second indication to transfer the set of second frames at a reduced DPU clock frequency and a reduced bandwidth frequency starting at the subsequent frame transfer interrupt time.

30 Claims, 12 Drawing Sheets

(52) U.S. Cl.
CPC ... *G09G 2310/04* (2013.01); *G09G 2330/021* (2013.01); *G09G 2350/00* (2013.01); *G09G 2360/121* (2013.01); *G09G 2360/18* (2013.01); *G09G 2370/10* (2013.01)

(58) Field of Classification Search
CPC ......... G09G 2350/00; G09G 2360/121; G09G 2360/18; G09G 2370/10
See application file for complete search history.

(56) References Cited

U.S. PATENT DOCUMENTS

| | | | | |
|---|---|---|---|---|
| 2014/0184629 | A1 | 7/2014 | Wyatt et al. | |
| 2014/0258754 | A1 | 9/2014 | Akenine-Moller et al. | |
| 2016/0247484 | A1 | 8/2016 | Chen et al. | |
| 2019/0041955 | A1 | 2/2019 | Kwa et al. | |
| 2020/0278735 | A1 | 9/2020 | Ansari et al. | |
| 2020/0278736 | A1* | 9/2020 | Ross ...................... | G11C 5/147 |
| 2022/0148537 | A1 | 5/2022 | Wang | |

* cited by examiner

DISPLAY PROCESSING UNIT PIXEL RATE BASED ON DISPLAY REGION OF INTEREST GEOMETRY

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a display processing unit (DPU), a graphics processing unit (GPU), or any apparatus that may perform display processing. The apparatus may receive a frame indication of a first frame prior to a partial frame update for the first frame; and identify that the first frame is associated with the partial frame update. The apparatus may also perform a partial frame update for a first frame at a first update time, where the partial frame update corresponds to an update of less than all content in the first frame, where the partial frame update for the first frame is associated with a panel region of interest (ROI) of the first frame. Additionally, the apparatus may calculate a margin time period between the first update time and a subsequent vertical synchronization (Vsync) time. The apparatus may also switch to a compositor latch signaled model based on the partial frame update for the first frame, where the compositor latch signaled model is a software model associated with an immediate consumption of a frame by the DPU. Moreover, the apparatus may calculate the subsequent frame transfer interrupt time based on the margin time period between the first update time and the subsequent Vsync time. The apparatus may also transmit, based on the margin time period, a first indication of a subsequent frame transfer interrupt time, where the subsequent frame transfer interrupt time is associated with a starting time to transfer a set of second frames prior to the subsequent Vsync time, where the set of second frames is subsequent to the first frame. The apparatus may also transmit, to a display processing unit (DPU), a second indication to transfer the set of second frames at a reduced DPU clock frequency and a reduced bandwidth starting at the subsequent frame transfer interrupt time. Further, the apparatus may identify an adjustment in a panel ROI for the set of second frames; and transmit, to the DPU, a third indication to transfer the set of second frames at a full DPU clock frequency and a full bandwidth based on the adjustment in the panel ROI for the set of second frames.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
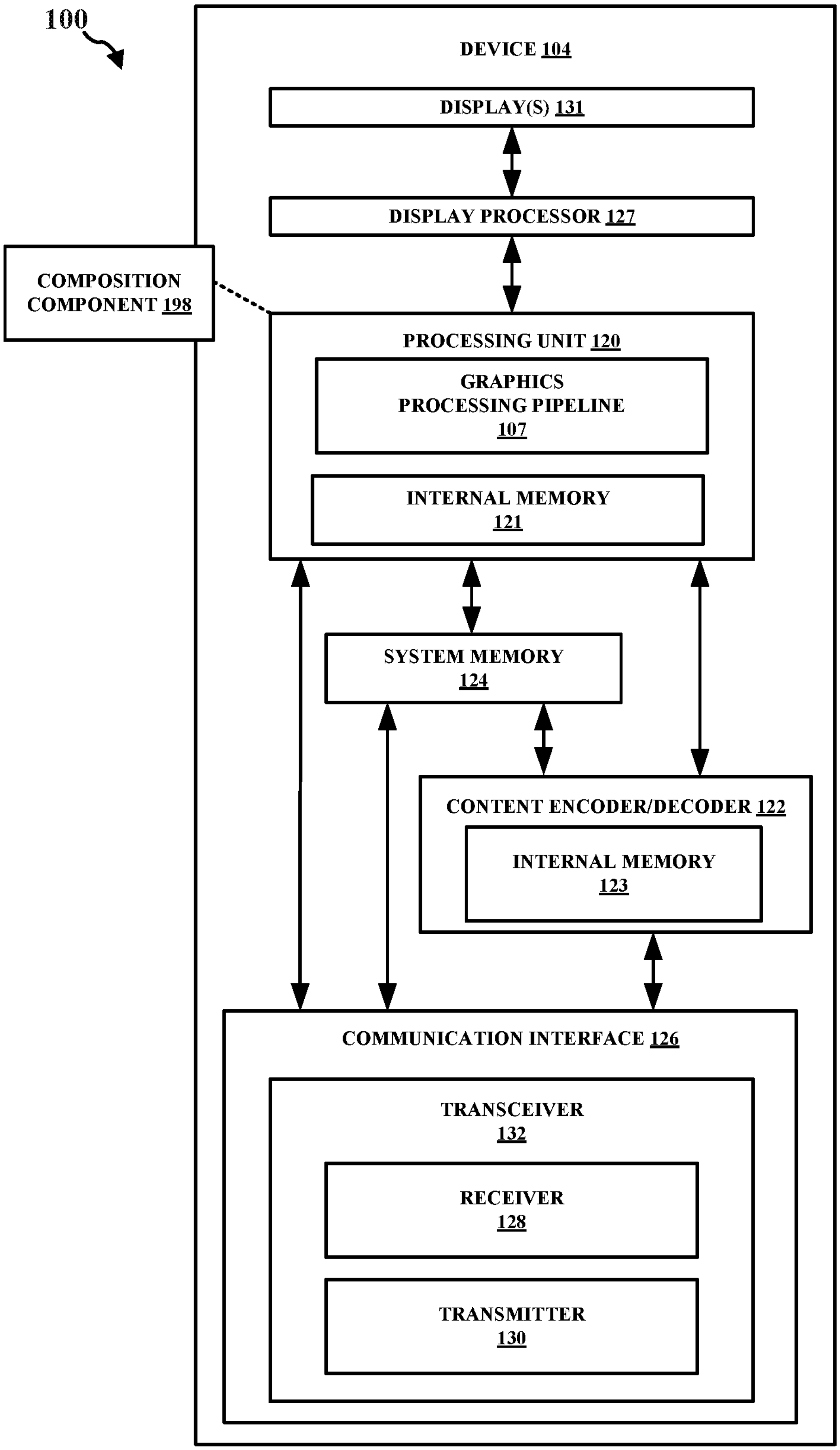
FIG. 1 is a block diagram that illustrates an example content generation system.

Display processing units (DPUs) may transfer pixel data to certain components (e.g., a display driver integrated circuit (DDIC)) at a constant rate. That is, each line (i.e., a display line) in the display may be transferred (e.g., transferred to DDIC memory) in a fixed time. Also, each line in the display may be transferred regardless of the time available before pixel data is consumed by a certain display component (e.g., a display controller (DC)). For example, during a video play application, although a certain number of lines is updated (e.g., 608 lines of 2520 are updated), the DPU may still need to transfer these lines in a certain amount of time (e.g., transfer 608 lines in 608/2520 time). Further, the display controller may have a certain number of static lines (e.g., 1912 static lines) to refresh from a previous frame before consuming these new lines. In some aspects, certain bandwidths for a partial frame update (i.e., an update of content for a portion of the frame) may be equivalent to a full frame update (i.e., an update of content for a full frame). That is, due to a partial frame composition algorithm, certain bandwidths for partial frame updates may need to be clocked (i.e., utilize a display clock resource) at the same level as a full frame. For example, a DPU bandwidth, display serial interface (DSI) bandwidth, and/or double data rate (DDR) bandwidth may need to be clocked at the same level as a full frame. Additionally, as the refresh rates for displays (e.g., 120 Hz, 144 Hz, 180 Hz, 240 Hz, etc.) have increased, the amount of display power utilized has correspondingly increased. In some instances, as indicated above, a DPU may transfer pixel data to a component (e.g., a display driver integrated circuit (DDIC)) at a constant rate regardless of the time available before pixel data is consumed. For instance, a DPU may transfer pixel data to a DDIC at a constant rate regardless of the time available before pixel data is consumed by a display controller (DC). For example, video playback may update a certain number of lines (e.g., 608 lines out of 2520 lines), yet the DC may still refresh 1912 static lines before consuming these new lines. Aspects of the present disclosure may optimize power at a DPU and/or display for partial frame updates. In some instances, aspects of the present disclosure may just refresh updated regions of a display during partial frame updates. For instance, aspects presented herein may avoid refreshing non-updated regions of a display during partial frame updates. By doing so, aspects presented herein may optimize power utilized at a DPU during partial frame updates, as solely the necessary/updating portions of the display are refreshed. Accordingly, aspects presented herein may prevent wasting power by refreshing the static portions of the frame (i.e., non-updating portions of the frame) during a partial frame update that does not update the static portions of the frame. That is, aspects presented herein may utilize certain display resources at a reduced level during a partial frame update, as compared to the level of display resources for a full frame update. For example, aspects presented herein may utilize some DPU or display resources (e.g., a DPU clock, DSI clock, and/or DDR clock) at a reduced level during partial frame updates, thereby saving power. Aspects presented herein may also utilize idle regions of the frame timing (e.g., due to partial frame updates) in order to transfer frames to the display panel at a lower clock speed. This may result in a reduction in visual artifacts (e.g., screen tearing) on the display screen, as well as a reduction in the amount of power utilized at the DPU.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/ decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a composition component 198 configured to receive a frame indication of a first frame prior to a partial frame update for the first frame; and identify that the first frame is associated with the partial frame update. The composition component 198 may also be configured to perform a partial frame update for a first frame at a first update time, where the partial frame update corresponds to an update of less than all content in the first frame, where the partial frame update for the first frame is associated with a panel region of interest (ROI) of the first frame. The composition component 198 may also be configured to calculate a margin time period between the first update time and a subsequent vertical synchronization (Vsync) time. The composition component 198 may also be configured to switch to a compositor latch signaled model based on the partial frame update for the first frame, where the compositor latch signaled model is a software model associated with an immediate consumption of a frame by the DPU. The composition component 198 may also be configured to calculate the subsequent frame transfer interrupt time based on the margin time period between the first update time and the subsequent Vsync time. The composition component 198 may also be configured to transmit, based on the margin time period, a first indication of a subsequent frame transfer interrupt time, where the subsequent frame transfer interrupt time is associated with a starting time to transfer a set of second frames prior to the subsequent Vsync time, where the set of second frames is subsequent to the first frame. The composition component 198 may also be configured to transmit, to a display processing unit (DPU), a second indication to transfer the set of second frames at a reduced DPU clock frequency and a reduced bandwidth starting at the subsequent frame transfer interrupt time. The composition component 198 may also be configured to identify an adjustment in a panel ROI for the set of second frames; and transmit, to the DPU, a third indication to transfer the set of second frames at a full DPU clock frequency and a full bandwidth based on the adjustment in the panel ROI for the set of second frames. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
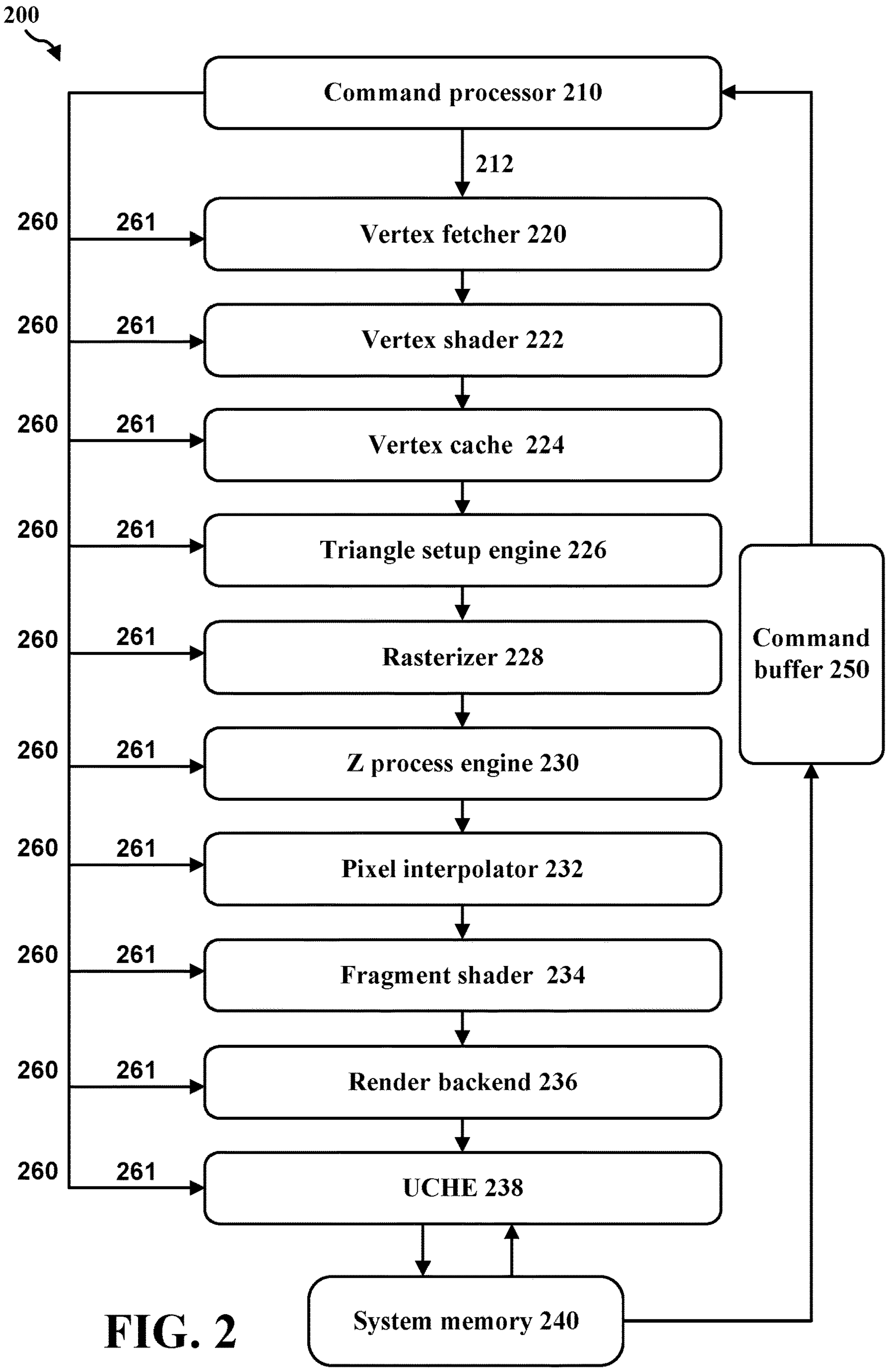
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
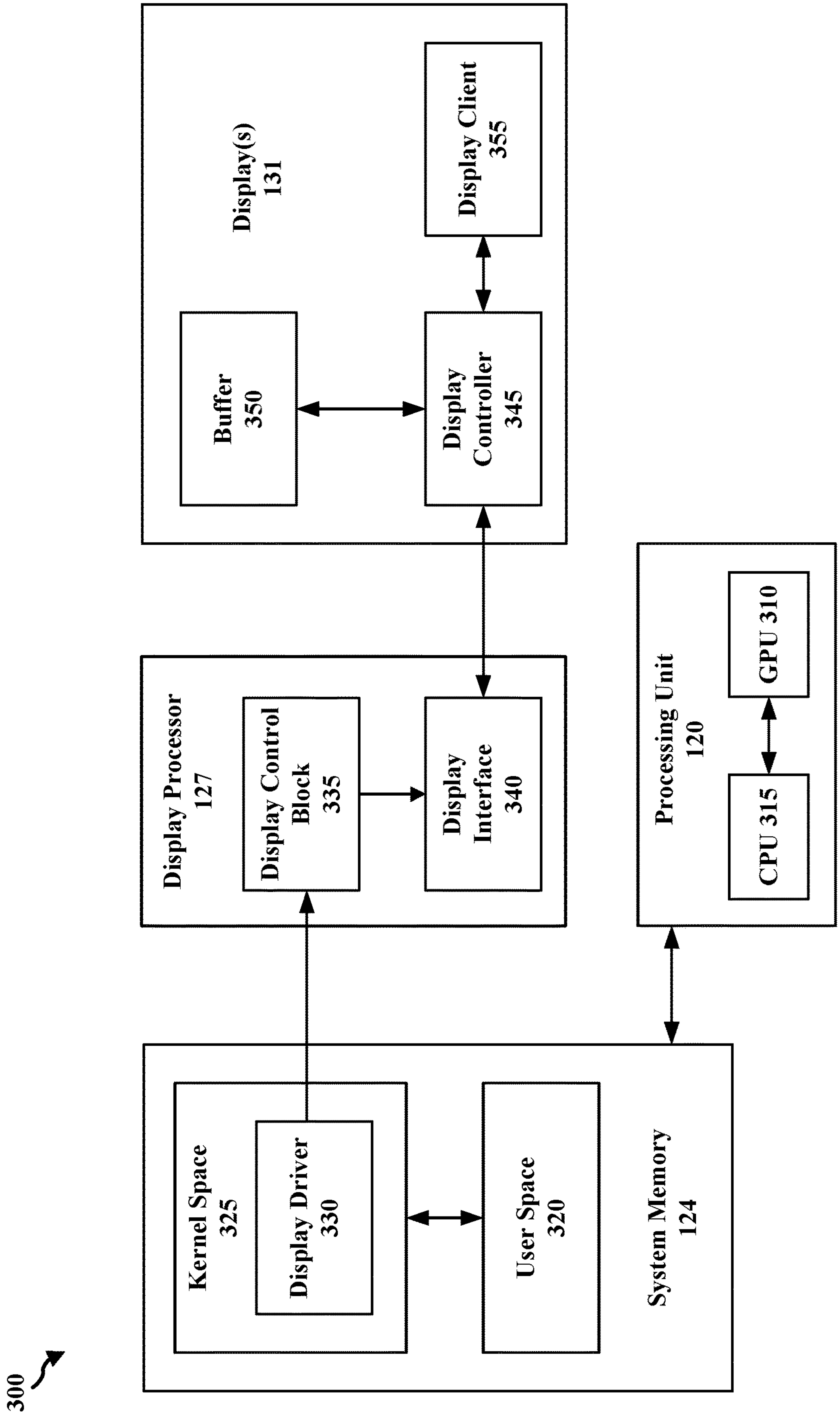
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
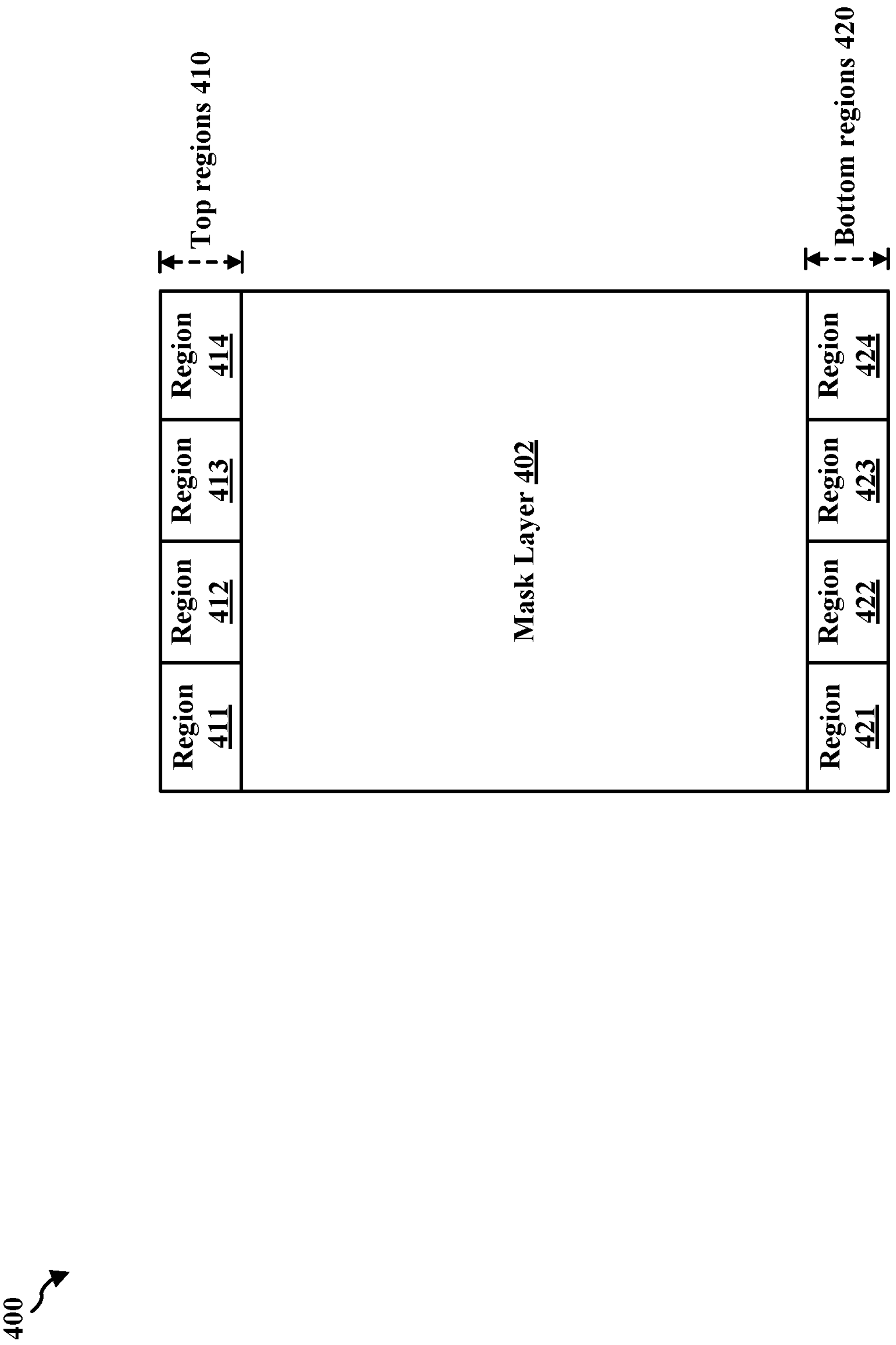
FIG. 4 is a diagram illustrating an example mask layer for display processing.

FIG. 4 is a diagram 400 illustrating an example mask layer for display processing. More specifically, diagram 400 depicts one type of mask layer that may represent portions of a display panel. As shown in FIG. 4, diagram 400 includes mask layer 402 including top regions 410 and bottom regions 420. Top regions 410 include region 411, region 412, region 413, and region 414, and bottom regions 420 include region 421, region 422, region 423, and region 424. As depicted in FIG. 4, mask layer 402 may represent the different regions that are displayed on a display panel.

Some types of displays may use a certain type of mask layer (e.g., a shape mask layer) to reshape a display frame.

For instance, a mask layer may reshape the display frame to provide more optimized visual shapes at the display panel (e.g., improved round corners, improved circular shape, improved rectangular shape, etc.). These types of mask layers (e.g., shape mask layers) may be processed by software (e.g., graphics processing unit (GPU) software or central processing unit (CPU) software) or by hardware (e.g., display processing unit (DPU) hardware). Also, these mask layers may be processed by other specific types of hardware logic modules (e.g., modules in a display driver integrated circuit (DDIC) or bridge chips). In some aspects, these types of mask layers (e.g., shape mask layers) may be based on certain unit, such as a pixel. That is, the shape generation basis unit of the shape mask layers may be a single pixel.

Some aspects of display processing may utilize frame buffers to cache or store a composition output of a GPU. For instance, display layers may be cached or stored in a frame buffer after composition at a GPU. In some aspects, a composition hardware (HW) or software (SW) stack may use a frame buffer target to cache a composition output (e.g., a GPU composition output or a CPU composition output). The cached composition output may then be sent to another processor (e.g., a DPU) as an input layer. The frame buffer may have a number of different color formats, such as a red (R) green (G) blue (B) alpha (A) (RGBA) format (e.g., RGBA8888 format). Also, the frame buffer may be a certain size, (e.g., a 32-bit triple buffer). For example, at the beginning of a display/graphics subsystem design, a frame buffer may be created as an RGBA8888 format and a 32-bit triple buffer. In some instances, if the frame layers do not use a certain composition (e.g., a GPU or client composition), the frame buffers may be ignored. Also, the layers (e.g., frame layers or display layers associated with display processing) may be directly fetched and composed. For instance, a DPU or hardware composer may directly fetch the layers and then compose the layers.

Figure 5:
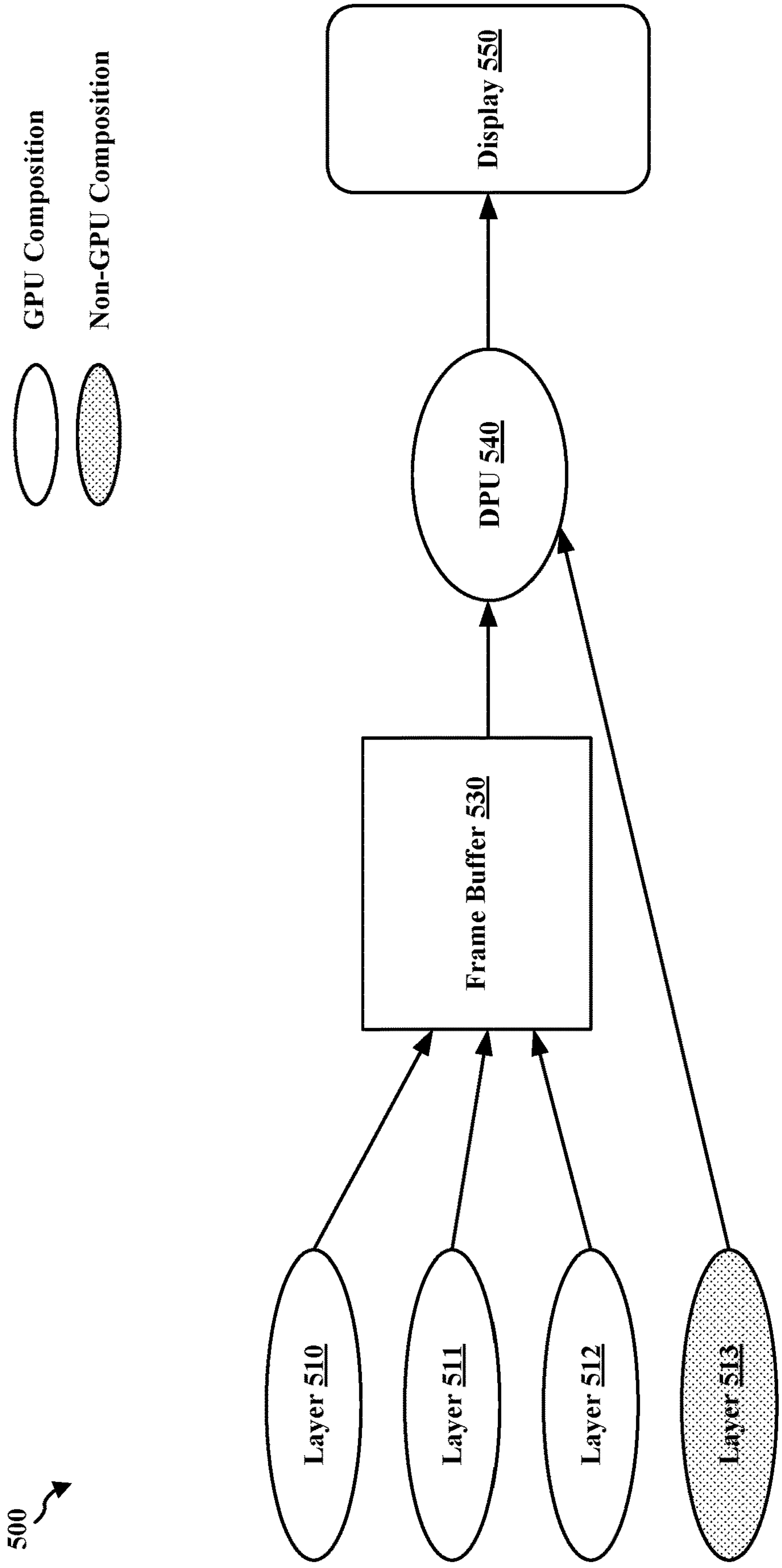
FIG. 5 is a diagram illustrating an example layer composition scheme for display processing.

FIG. 5 is a diagram 500 illustrating an example of a layer composition scheme for display processing. More specifically, diagram 500 depicts a layer composition of display layers where certain layers (e.g., layers of a certain composition) are cached in a frame buffer, and some layers are directly fetched and composed by a DPU. As shown in FIG. 5, diagram 500 includes layer 510, layer 511, layer 512, layer 513, frame buffer 530 (e.g., an RGBA8888 format frame buffer), DPU 540, and display 550. FIG. 5 depicts that layers composed at a GPU (i.e., layers associated with GPU composition) may be cached or stored in a frame buffer. For example, layer 510, layer 511, and layer 512 may be composed at a GPU and then cached/stored at frame buffer 530. Alternatively, layers that are not composed at a GPU (i.e., layers associated with non-GPU composition) may be directly fetched and composed at a DPU. For instance, layer 513 may be directly fetched and composed at DPU 540. That is, layer 510, layer 511, and layer 512 may be a certain type of composition (e.g., GPU composition), while layer 513 may be another type of composition (non-GPU composition). After being cached/stored in frame buffer 530, the layer 510, layer 511, and layer 512 may be sent to DPU 540. Further, after processing at DPU 540, the layers 510-513 may be sent to display 550.

Some types of display processing devices (e.g., mobile devices, computers, TVs, or other consumer devices) may utilize complex multiple content layouts in a single display processing layer or multiple display processing layers. That is, for graphics or display stacks in operating systems of the devices, there may be a single display processing layer (i.e., display layer or layer that is associated with display processing) or multiple display processing layers. For instance, there may be at least one display layer that may be associated with a screen or frame for a display processing device, such that the display panel at the device may be divided amongst the display layers. Additionally, for content or end users, there may be multiple content entities in the display processing layer. This may be due to operating system limitations and/or application rendering/resource management limitations. Further, some types of applications may choose to render in using a single display processing layer. Color processing capability on a per-region basis (i.e., for each region of interest (ROI) in a layer) may be utilized with certain types of display processing unit (DPU) architecture.

Different types of DPU image processing (e.g., DPU per-layer flexible image processing) may be utilized by current mobile consumer electronics devices. Based on the content of different layers, providing accurate per-layer image processing may be important to the perception of an end user. There may be a number of different types of per-layer image processing, such as video high dynamic range (HDR) layer tone mapping and processing and/or video standard dynamic range (SDR) layer visual contrast boosting. Types of per-layer image processing may also include proper tone mapping for photo image layers, game layer color processing and flexible visual control options provided to end users, flexible visual control options for video layers provided to end users, and flexible visual control options for texts/user interface (UI) layers provided to end users.

Display processing units (DPUs) may be included in a number of different display devices (e.g., smart phones or user equipments (UEs)). In some aspects, DPUs may be utilized to determine a certain bandwidth (e.g., a double data rate (DDR) bandwidth), as a DPU may blend and transfer data to a display panel for each line in a frame or display. Also, this blending and transferring of data may be performed within a fixed line time for the frame or display. Display bandwidth requests or selections (i.e., display bandwidth votes) may account for total number of pixels that may need to be fetched to produce a line in a frame or display. Thus, the display bandwidth request or vote may increase in proportion to a total number of overlapping layers in a frame or display.

In some aspects, a display bandwidth vote (i.e., a display bandwidth request or selection) may be a request from the DPU for an amount of display bandwidth from the display hardware. For instance, a display bandwidth vote may be a request for an increase in bandwidth for a corresponding increase in voltage or power. For example, a display bandwidth vote may be based on a number of overlaps, a frame rate, a vertical active amount, a horizontal active amount, and a number of bytes per pixel. As an equation, display bandwidth vote=(number of overlaps)*(frame rate)*(vertical active amount)*(horizontal active amount)*(number of bytes per pixel). For example, a home screen display may include the following display bandwidth vote: display bandwidth vote=4*60*1440*2560*4=3.3 gigabytes per second (Gbps), e.g., on 1440×2560 display at 60 Hz.

Display processing units (DPUs) may transfer pixel data to certain components (e.g., a display driver integrated circuit (DDIC)) at a constant rate. That is, each line (i.e., a display line) in the display may be transferred (e.g., transferred to DDIC memory) in a fixed time. Also, each line in the display may be transferred regardless of the time available before pixel data is consumed by a certain display component (e.g., a display controller (DC)). For example, during a video play application, although a certain number of lines is updated (e.g., 608 lines of 2520 are updated), the DPU may still need to transfer these lines in a certain amount of time (e.g., transfer 608 lines in 608/2520 time). Further, the display controller may have a certain number of static lines (e.g., 1912 static lines) to refresh from a previous frame before consuming these new lines.

Figure 6:
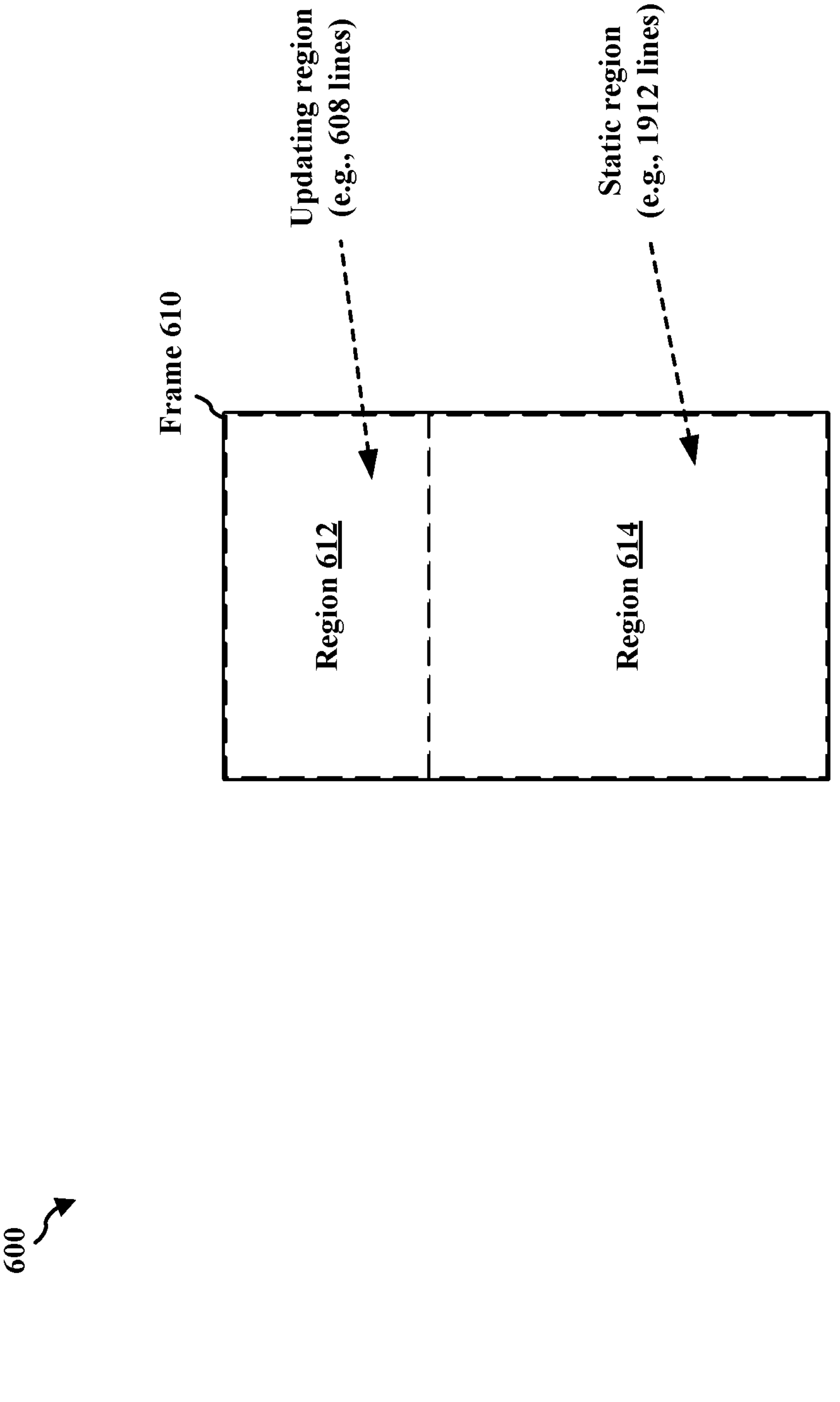
FIG. 6 is a diagram illustrating an example of a frame.

FIG. 6 includes diagram 600 illustrating an example of a frame at a display device. More specifically, diagram 600 illustrates a frame 610 including an updating region (e.g., region 612) and a static region (e.g., region 614). As shown in FIG. 6, diagram 600 includes frame 610, region 612 (i.e., updating region) with a certain amount of lines (e.g., 608 lines), and region 614 (i.e., static region) with a certain amount of lines (e.g., 1912 lines). As depicted in FIG. 6, a portion of frame 610 may update a certain amount of lines at a time (e.g., region 612 may update 608 lines at a time). Also, a portion of frame 610 may include a certain amount of lines that are static or not updated (e.g., region 614 may include 1912 static lines). Moreover, the display controller for frame 610 may have a certain number of static lines corresponding to region 614 (e.g., 1912 static lines) to refresh from a previous frame before consuming these new lines. Region 612 and region 614 may be referred to as a region of interest (ROI) or a display ROI. Accordingly, FIG. 6 is an example of updating display lines based on a display region of interest (ROI).

In some aspects, certain bandwidths for a partial frame update (i.e., an update of content for a portion of the frame) may be equivalent to a full frame update (i.e., an update of content for a full frame). That is, due to a partial frame composition algorithm, certain bandwidths for partial frame updates may need to be clocked (i.e., utilize a display clock resource) at the same level as a full frame. For example, a DPU bandwidth, display serial interface (DSI) bandwidth, and/or double data rate (DDR) bandwidth may need to be clocked at the same level as a full frame. Additionally, as the refresh rates for displays (e.g., 120 Hz, 144 Hz, 180 Hz, 240 Hz, etc.) have increased, the amount of display power utilized has correspondingly increased. In some instances, as indicated above, a DPU may transfer pixel data to a component (e.g., a display driver integrated circuit (DDIC)) at a constant rate regardless of the time available before pixel data is consumed. For instance, a DPU may transfer pixel data to a DDIC at a constant rate regardless of the time available before pixel data is consumed by a display controller (DC). For example, video playback may update a certain number of lines (e.g., 608 lines out of 2520 lines), yet the DC may still refresh 1912 static lines before consuming these new lines.

Based on the above, it may be beneficial to find ways to optimize power at a display for partial frame updates. For instance, it may be beneficial to just refresh updated regions of a display during partial frame updates. Also, it may be beneficial to avoid refreshing non-updated regions of a display during partial frame updates. Further, it may be beneficial to utilize certain display resources (e.g., DPU clock, DSI clock, and/or DDR clock) at a reduced level during a partial frame update, as compared to the level of display resources for a full frame update.

Aspects of the present disclosure may optimize power at a DPU and/or display for partial frame updates. In some instances, aspects of the present disclosure may just refresh updated regions of a display during partial frame updates. For instance, aspects presented herein may avoid refreshing non-updated regions of a display during partial frame updates. By doing so, aspects presented herein may optimize power utilized at a DPU during partial frame updates, as solely the necessary/updating portions of the display are refreshed. Accordingly, aspects presented herein may prevent wasting power by refreshing the static portions of the frame (i.e., non-updating portions of the frame) during a partial frame update that does not update the static portions of the frame. That is, aspects presented herein may utilize certain display resources at a reduced level during a partial frame update, as compared to the level of display resources for a full frame update. For example, aspects presented herein may utilize some DPU or display resources (e.g., a DPU clock, DSI clock, and/or DDR clock) at a reduced level during partial frame updates, thereby saving power. Aspects presented herein may also utilize idle regions of the frame timing (e.g., due to partial frame updates) in order to transfer frames to the display panel at a lower clock speed. This may result in a reduction in visual artifacts (e.g., screen tearing) on the display screen, as well as a reduction in the amount of power utilized at the DPU.

In some instances, aspects of the present disclosure may calculate a margin time between a frame update time and a next vertical synchronization (Vsync) time. Vsync timing is a means to synchronize the frame rate of an application (e.g., a video game) with the refresh rate of a corresponding display or monitor. Applications, GPUs, and/or DPUs may utilize Vsync timing to eliminate certain visual artifacts, such as screen tearing (i.e., a split in a portion of a displayed frame, where a portion of the frame lags behind the other portions). In some instances, aspects presented herein may utilize a software solution duration for a frame commit and a margin available before a next Vsync time. Also, a certain timing structure (e.g., an advance frame transfer interrupt time) may be generated ahead of the Vsync time based on the estimated margin and panel ROI. After this certain timing structure, the frame may be transferred to the display at a reduced clock speed. By doing so, this may avoid certain visual artifacts, such as screen tearing (i.e., a split in a portion of a displayed frame, where a portion of the frame lags behind the other portions).

Additionally, aspects presented herein may trigger an advanced frame transfer interrupt time, which may be generated ahead of next Vsync time, based on the estimated margin and panel ROI. In some instances, a previous frame update may be sent to the display panel and may correspond to an update on the display screen. The static region (i.e., non-updating region) of the frame may not be sent display panel, as it may not need to be updated on the display screen. Aspects presented herein may make use of the static region where the DPU may be idle. That is, aspects presented herein may utilize the idle region of the frame timing, and generate an interrupt time just after the frame transfer of the previous frame. So on the interrupt time, the frame may be transferred to the display panel at a lower clock speed without causing any visual artifacts (e.g., screen tearing) on the display screen. Accordingly, aspects presented herein may utilize the extra margin time that is available that corresponds to static regions of the frame where the DPU may not transfer data to the panel. As such, aspects presented herein may utilize the static regions of the frame in order to transfer the next frame ahead of time (e.g., transfer the next frame at a slower rate). Thus, instead of transferring the data during the updating regions of the frame (e.g., 25% of the time), aspects presented herein utilize the remaining time (e.g., 75% of the previous frames duration) in order to transfer frames at a slower rate. By doing so, aspects presented herein may optimize the power utilized at a DPU and/or display.

Aspects of the present disclosure may estimate a margin available between a frame update time and a next vertical synchronization (Vsync) time. For instance, aspects presented herein may utilize a software model where a duration for a frame commit (e.g., a frame update time) and the margin available before the next vertical synchronization (Vsync) time is estimated. Aspects of the present disclosure may also utilize a model that generates an advance frame transfer interrupt is ahead of the next Vsync time, such as based on the estimated margin and a display panel region of interest (ROI). Additionally, aspects presented herein may transfer a frame to a display panel at a slower clock speed without experiencing visual artifacts (e.g., tearing the screen). This frame may be transferred at a slower clock speed at a certain time (e.g., on a frame interrupt time).

In some aspects, aspects presented herein may allow for content to be ready ahead of the next Vsync time. For instance, in some ROI use cases and/or partial frame updates, aspects presented herein may allow for content to be ready ahead of the next Vsync time. For example, this may apply to video play during certain applications. Also, a software duration may be reduced due to buffer flips (i.e., there may be plenty of idle time before the next Vsync time when the frame will be transferred). Moreover, the DPU may use this idle time to amortize pixel transfer over one V sync duration. That is, as aspects presented herein solely transfer the updating portions of the frame during partial frame updates, the frame may be transferred at a slower clock speed by utilizing the idle margin time corresponding to static portions of the frame (e.g., non-updating portions of the frame).

Figure 7:
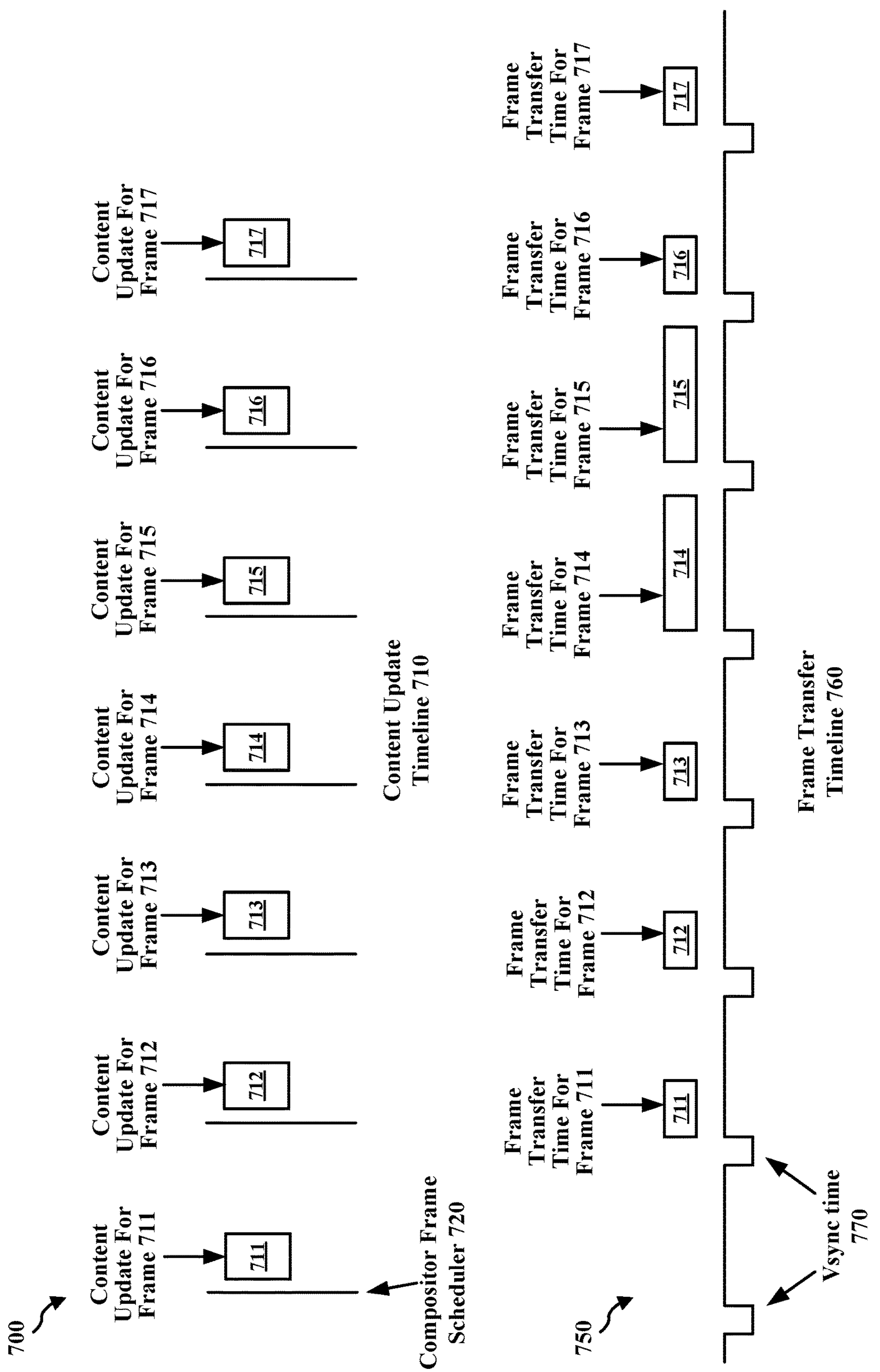
FIG. 7 is a diagram illustrating an example of a content update timeline and a frame transfer timeline.

FIG. 7 includes diagram 700 and diagram 750 illustrating an example of a content update timeline and a frame transfer timeline, respectively. More specifically, diagram 700 illustrates a timeline for a content update (e.g., content update timeline 710) and diagram 750 illustrates a frame transfer (e.g., frame transfer timeline 760) for display processing. As shown in FIG. 7, diagram 700 includes a content update timeline 710 including a content update for a number of frames (e.g., frame 711, frame 712, frame 713, frame 714, frame 715, frame 716, and frame 717), as well as a compositor frame scheduler 720. Diagram 750 depicts a frame transfer timeline 760 including a frame transfer time for a number of frames (e.g., frame 711, frame 712, frame 713, frame 714, frame 715, frame 716, and frame 717), as well as a Vsync time 770. FIG. 7 illustrates that each frame (e.g., frame 711, frame 712, frame 713, frame 714, frame 715, frame 716, and frame 717) is transferred at the start of the next Vsync time (e.g., Vsync time 770). As such, there may be a lot of idle time between frames for static or non-updating portions of the frame.

Aspects of the present disclosure may utilize display software (e.g., software at a central processing unit (CPU) or display driver software) that builds software duration heuristics and/or predicts composition timelines for ROI use cases. Also, aspects presented herein may utilize display software that calculates line pointer interrupt values based on an idle time prediction and/or configure tear check blocks in display systems (e.g., a multimedia display subsystem (MDSS)). Further, aspects presented herein may utilize display software that switches to a certain compositor model (e.g., a compositor 'latch signaled' model) to guarantee content availability on the interrupt for a DPU driver. A compositor latch signaled model may be a software model that is associated with an immediate consumption of a frame by the DPU. Additionally, aspects presented herein may utilize display software that switches to a lower DPU clock and DSI clock before a frame ROI transfer. Aspects presented herein may also utilize display software that tunes CPU frequency if delays are predicted on occasional geometry changes.

Figure 8:
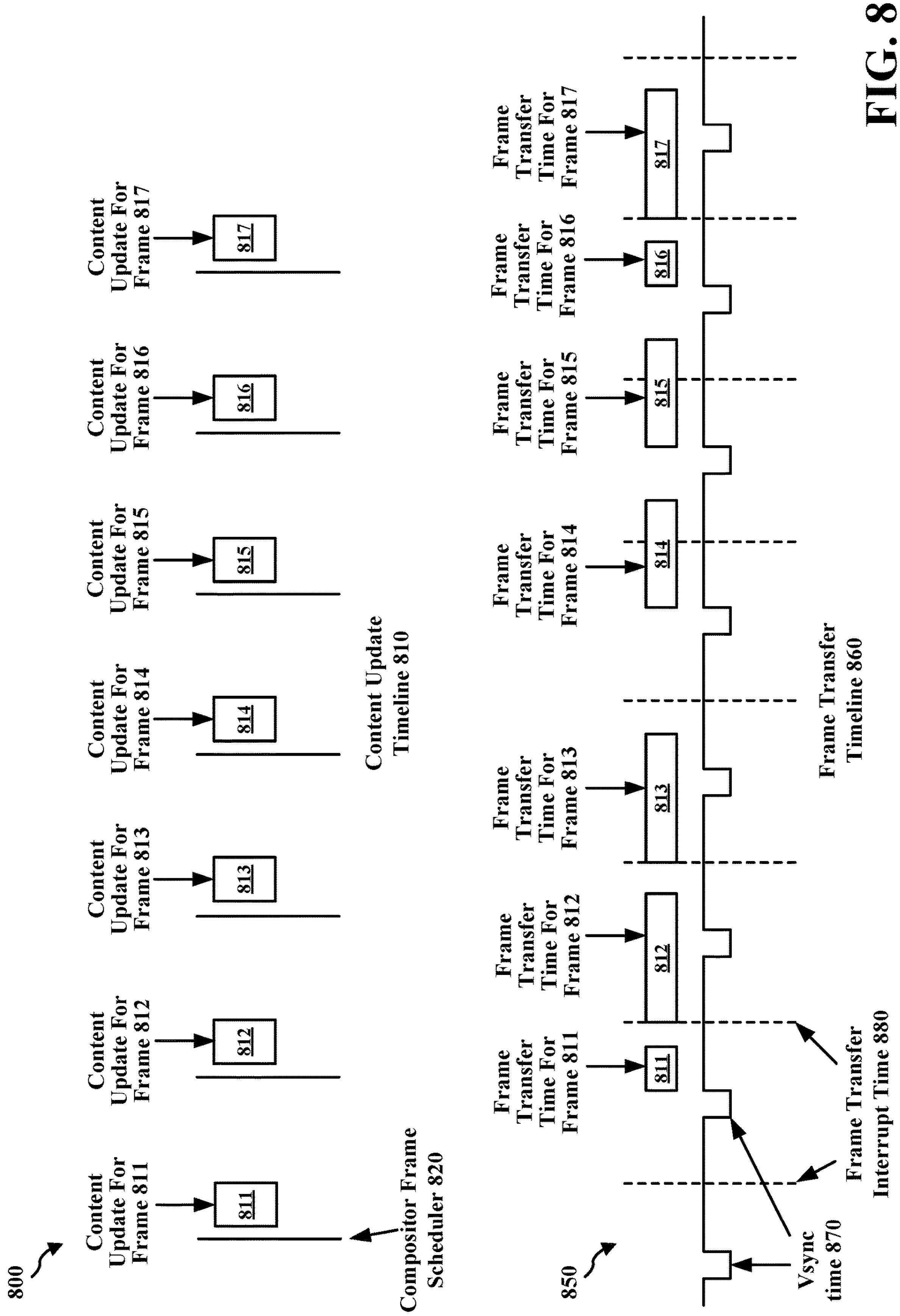
FIG. 8 is a diagram illustrating example of a content update timeline and a frame transfer timeline.

FIG. 8 includes diagram 800 and diagram 850 illustrating an example of a content update timeline and a frame transfer timeline, respectively. More specifically, diagram 800 illustrates a timeline for a content update (e.g., content update timeline 810) and diagram 850 illustrates a frame transfer (e.g., frame transfer timeline 860) for display processing. As shown in FIG. 8, diagram 800 includes a content update timeline 810 including a content update for a number of frames (e.g., frame 811, frame 812, frame 813, frame 814, frame 815, frame 816, and frame 817), as well as a compositor frame scheduler 820. Diagram 850 depicts a frame transfer timeline 860 including a frame transfer time for a number of frames (e.g., frame 811, frame 812, frame 813, frame 814, frame 815, frame 816, and frame 817), as well as a Vsync time 870. Moreover, diagram 850 includes a frame transfer interrupt time 880. FIG. 8 illustrates that each frame (e.g., frame 811, frame 812, frame 813, frame 814, frame 815, frame 816, and frame 817) may be transferred at the start of the next Vsync time (e.g., Vsync time 870) or transferred at the start of the frame transfer interrupt time 880. That is, if there is a lot of idle time between frames for static or non-updating portions of the frame, then the frame may be transferred at the start of the frame transfer interrupt time 880 (e.g., frame 812, frame 813, and frame 817). By doing so, aspects presented herein may transfer a set of frames at a reduced DPU clock frequency and a reduced bandwidth starting at the subsequent frame transfer interrupt time.

As shown in FIG. 8, aspects presented herein may perform a partial frame update for a first frame (e.g., frame 811) at a first update time, where the partial frame update corresponds to an update of less than all content in the first frame, where the partial frame update for the first frame is associated with a panel region of interest (ROI) of the first frame. Also, aspects presented herein may calculate a margin time period between the first update time and a subsequent Vsync time (e.g., Vsync time 870). Further, aspects presented herein may transmit a first indication of a subsequent frame transfer interrupt time (e.g., frame transfer interrupt time 880), where the subsequent frame transfer interrupt time is associated with a starting time to transfer a set of second frames prior to the subsequent Vsync time (e.g., Vsync time 870), where the set of second frames (e.g., frame 812 and frame 813) is subsequent to the first frame (e.g., frame 811). Aspects presented herein may also transmit, to a DPU, a second indication to transfer the set of second frames (e.g., frame 812 and frame 813) at a reduced DPU clock frequency and a reduced bandwidth starting at the subsequent frame transfer interrupt time (e.g., frame transfer interrupt time 880).

Figure 9:
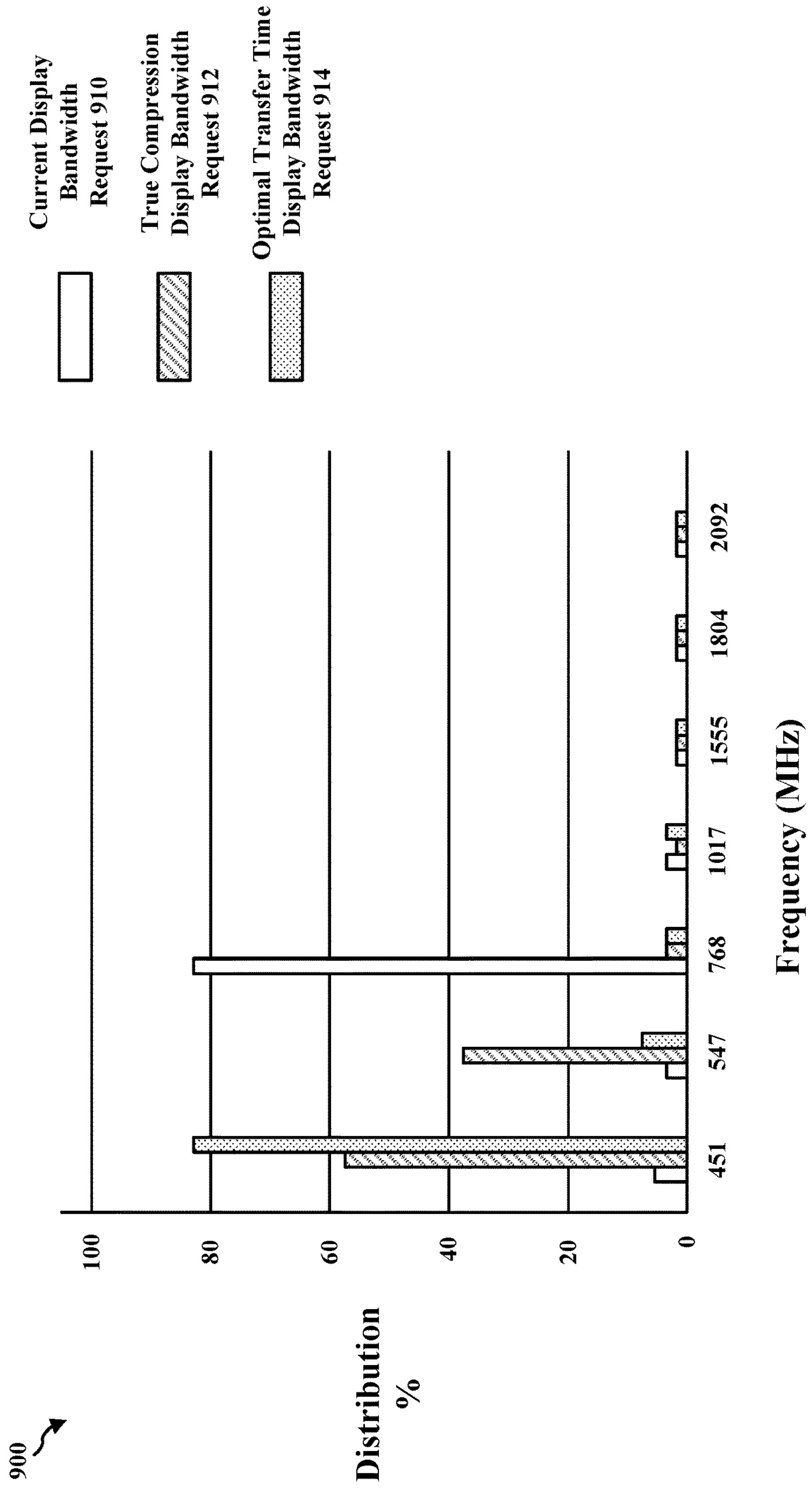
FIG. 9 is a graph illustrating an example of a bandwidth distribution charted against a frequency.

FIG. 9 includes graph 900 illustrating an example of bandwidth distribution charted against frequency. More specifically, graph 900 illustrates a bandwidth distribution percentage charted against a frequency in MHz (e.g., a frequency of 451 MHz, 547 MHz, 768 MHz, 1017 MHz, 1555 MHz, 1804 MHz, or 2092 MHz). As shown in FIG. 9, graph 900 includes a current display bandwidth request 910 (i.e., a current display bandwidth vote), a true compression display bandwidth request 912 (i.e., a true compression display bandwidth vote), and an optimal transfer time display bandwidth request 914 (i.e., an optimal transfer time display bandwidth vote). FIG. 9 illustrates that for lower frequencies (e.g., a frequency of 451), aspects presented herein may have a higher distribution percentage for an optimal transfer time display bandwidth request (e.g., optimal transfer time display bandwidth request 914). As the frequencies increase, the distribution percentage for the optimal transfer time display bandwidth request (e.g., optimal transfer time display bandwidth request 914) may decrease. That is, aspects presented herein may include a power advantage for lower frequencies during partial frame updates, as frames may be transferred at a reduced DPU clock frequency and a reduced bandwidth for frames with static or non-updating regions.

Aspects of the present disclosure may include a number of benefits or advantages. For instance, aspects presented herein may optimize power at a DPU and/or display for partial frame updates. Aspects of the present disclosure may also refresh updated regions of a display during partial frame updates. That is, aspects presented herein may avoid refreshing non-updated regions of a display during partial frame updates. By doing so, aspects presented herein may optimize power utilized at a DPU during partial frame updates, as solely the necessary/updating portions of the display are refreshed. Thus, aspects presented herein may prevent wasting power by refreshing the static portions of the frame (i.e., non-updating portions of the frame) during a partial frame update that does not update the static portions of the frame. Aspects presented herein may utilize certain display resources at a reduced level during a partial frame update, as compared to the level of display resources for a full frame update. For example, aspects presented herein may utilize some DPU or display resources (e.g., a DPU clock, DSI clock, and/or DDR clock) at a reduced level during partial frame updates, thereby saving power. Also, aspects presented herein may utilize idle regions of the frame timing (e.g., due to partial frame updates) in order to transfer frames to the display panel at a lower clock speed. This may result in a reduction in visual artifacts (e.g., screen tearing) on the display screen, as well as a reduction in the amount of power utilized at the DPU.

Figure 10:
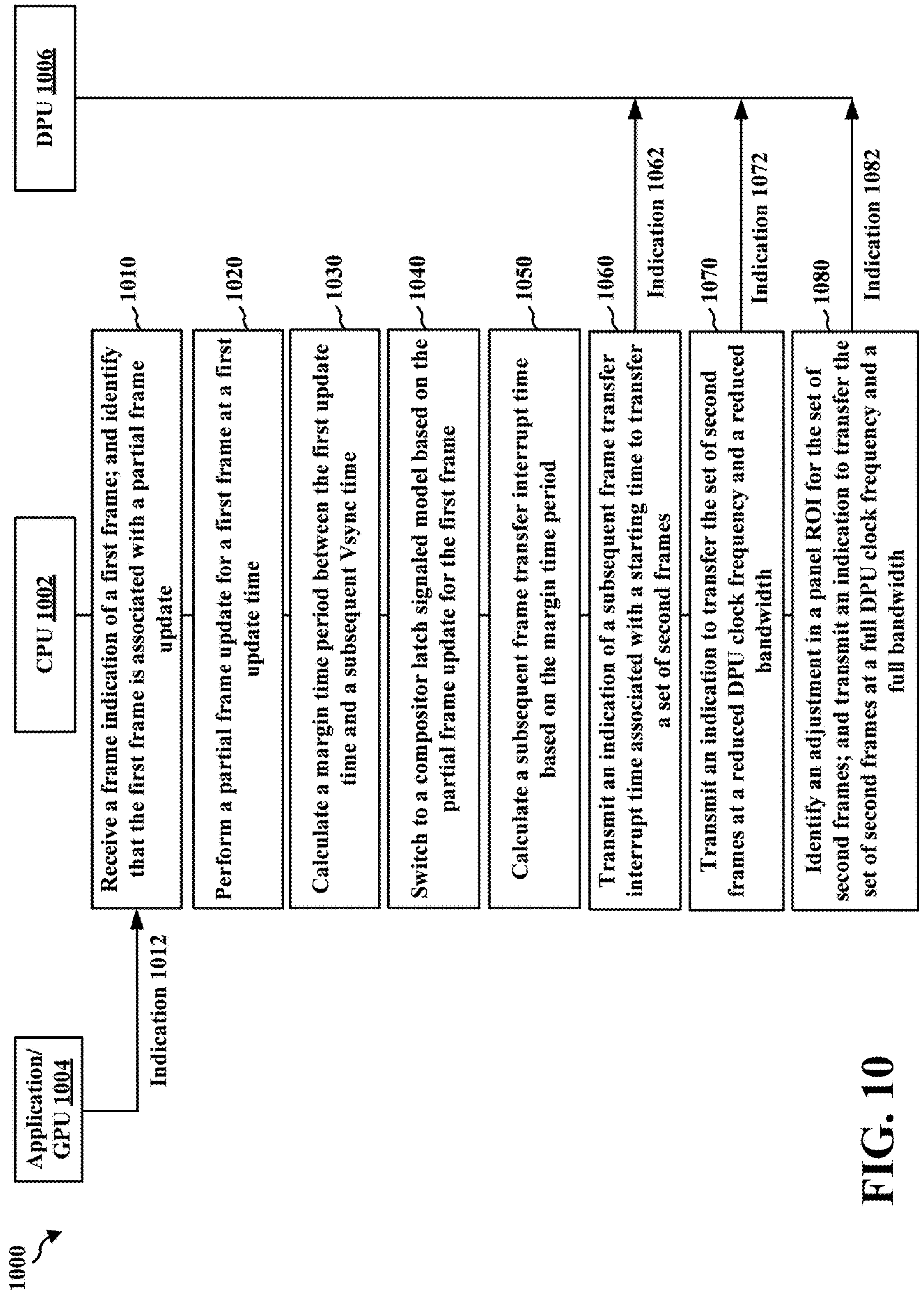
FIG. 10 is a communication flow diagram illustrating example communications between a CPU, an application, and a DPU.

FIG. 10 is a communication flow diagram 1000 of display processing in accordance with one or more techniques of this disclosure. As shown in FIG. 10, diagram 1000 includes example communications between CPU 1002 (e.g., a DPU driver, other central processor, or display processor), application/GPU 1004 (e.g., an application or a GPU), and DPU 1006, in accordance with one or more techniques of this disclosure.

At 1010, CPU 1002 may receive a frame indication of a first frame (e.g., receive indication 1012 from application/GPU 1004) prior to a partial frame update for the first frame.

Also, at 1010, CPU 1002 may identify that the first frame is associated with the partial frame update.

At 1020, CPU 1002 may perform a partial frame update for a first frame at a first update time, where the partial frame update corresponds to an update of less than all content in the first frame, where the partial frame update for the first frame is associated with a panel region of interest (ROI) of the first frame. In some aspects, the partial frame update for the first frame may be performed with a full DPU clock frequency and a full bandwidth.

At 1030, CPU 1002 may calculate a margin time period between the first update time and a subsequent vertical synchronization (Vsync) time. The subsequent Vsync time may be subsequent to the first update time. Also, the first update time may correspond to a frame transfer time for the first frame. In some aspects, calculating the margin time period between the first update time and the subsequent Vsync time may include: generating one or more software duration heuristics; and predicting one or more composition timelines for a panel ROI of the set of second frames. That is, the CPU may generate one or more software duration heuristics; and predict one or more composition timelines for a panel ROI of the set of second frames.

At 1040, CPU 1002 may switch to a compositor latch signaled model based on the partial frame update for the first frame, where the compositor latch signaled model is a software model associated with an immediate consumption of a frame by the DPU.

At 1050, CPU 1002 may calculate the subsequent frame transfer interrupt time based on the margin time period between the first update time and the subsequent Vsync time.

At 1060, CPU 1002 may transmit, based on the margin time period, a first indication of a subsequent frame transfer interrupt time (e.g., transmit indication 1062 to DPU 1006), where the subsequent frame transfer interrupt time is associated with a starting time to transfer a set of second frames prior to the subsequent Vsync time, where the set of second frames is subsequent to the first frame. Also, the first indication of the subsequent frame transfer interrupt time may be transmitted to the DPU. In some aspects, transmitting the first indication of the subsequent frame transfer interrupt time may include: programming the DPU to generate the subsequent frame transfer interrupt time prior to the subsequent Vsync time. That is, the CPU may program the DPU to generate the subsequent frame transfer interrupt time prior to the subsequent Vsync time.

At 1070, CPU 1002 may transmit, to a display processing unit (DPU), a second indication to transfer the set of second frames at a reduced DPU clock frequency and a reduced bandwidth starting at the subsequent frame transfer interrupt time (e.g., transmit indication 1072 to DPU 1006). The transfer of the set of second frames at the reduced DPU clock frequency and the reduced bandwidth may correspond to an amortization of a pixel transfer for the set of second frames. Also, the DPU may be programmed to transfer the set of second frames at a subsequent frame programming time. In some aspects, transmitting the second indication to transfer the set of second frames at the reduced DPU clock frequency and the reduced bandwidth may include: programming the DPU to transfer the set of second frames at the reduced DPU clock frequency and the reduced bandwidth. That is, the CPU may program the DPU to transfer the set of second frames at the reduced DPU clock frequency and the reduced bandwidth. In some aspects, the second indication to transfer the set of second frames may be generated by at least one of: a central processing unit (CPU) or DPU driver software. Also, the DPU may include at least one of: DPU hardware or at least one display processor. In some instances, the set of second frames may be transferred at the reduced DPU clock frequency and the reduced bandwidth until an adjustment in a panel ROI for the set of second frames.

At 1080, CPU 1002 may identify an adjustment in a panel ROI for the set of second frames.

Also, at 1080, CPU 1002 may transmit, to the DPU, a third indication to transfer the set of second frames at a full DPU clock frequency and a full bandwidth based on the adjustment in the panel ROI for the set of second frames (e.g., transmit indication 1082 to DPU 1006). The third indication may be transmitted to the DPU at the subsequent Vsync time. In some aspects, transmitting the third indication to transfer the set of second frames at the full DPU clock frequency and the full bandwidth may include: reprogramming the DPU to transfer the set of second frames at the full DPU clock frequency and the full bandwidth. That is, the CPU may reprogram the DPU to transfer the set of second frames at the full DPU clock frequency and the full bandwidth.

Figure 11:
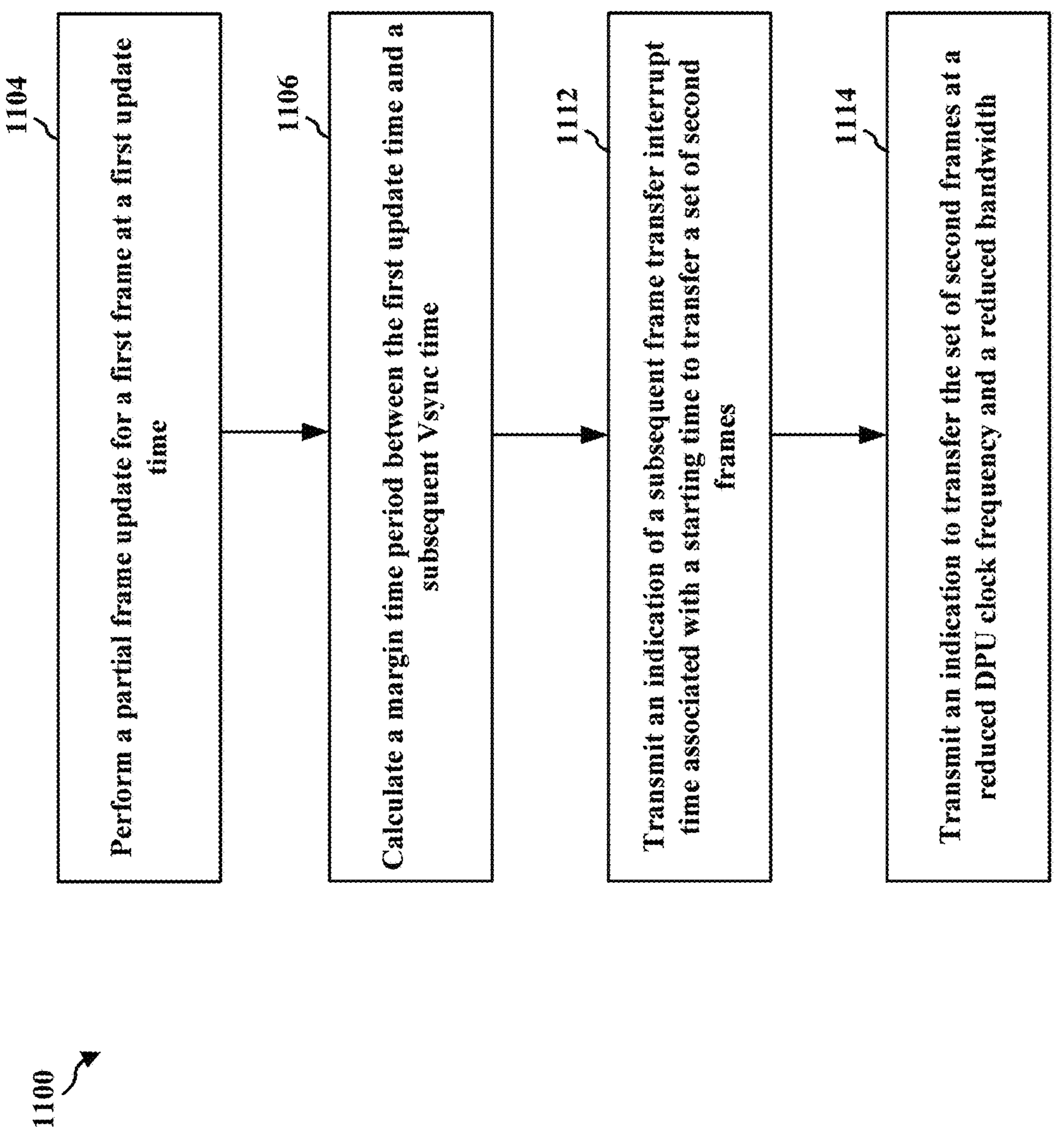
FIG. 11 is a flowchart of an example method of display processing.

FIG. 11 is a flowchart 1100 of an example method of display processing in accordance with one or more techniques of this disclosure. The method may be performed by a CPU (or other central processor), a DPU driver, a DPU (or other display processor), a GPU (or other graphics processor), a DDIC, an apparatus for display processing, a wireless communication device, and/or any apparatus that may perform display processing as used in connection with the examples of FIGS. 1-10.

At 1104, the CPU may perform a partial frame update for a first frame at a first update time, where the partial frame update corresponds to an update of less than all content in the first frame, where the partial frame update for the first frame is associated with a panel region of interest (ROI) of the first frame, as described in connection with the examples in FIGS. 1-10. For example, as described in 1020 of FIG. 10, CPU 1002 may perform a partial frame update for a first frame at a first update time, where the partial frame update corresponds to an update of less than all content in the first frame, where the partial frame update for the first frame is associated with a panel region of interest (ROI) of the first frame. Further, step 1104 may be performed by processing unit 120 in FIG. 1. In some aspects, the partial frame update for the first frame may be performed with a full DPU clock frequency and a full bandwidth.

At 1106, the CPU may calculate a margin time period between the first update time and a subsequent vertical synchronization (Vsync) time, as described in connection with the examples in FIGS. 1-10. For example, as described in 1030 of FIG. 10, CPU 1002 may calculate a margin time period between the first update time and a subsequent vertical synchronization (Vsync) time. Further, step 1106 may be performed by processing unit 120 in FIG. 1. In some aspects, calculating the margin time period between the first update time and the subsequent Vsync time may include: generating one or more software duration heuristics; and predicting one or more composition timelines for a panel ROI of the set of second frames. That is, the CPU may generate one or more software duration heuristics; and predict one or more composition timelines for a panel ROI of the set of second frames.

At 1112, the CPU may transmit, based on the margin time period, a first indication of a subsequent frame transfer interrupt time, where the subsequent frame transfer interrupt time is associated with a starting time to transfer a set of second frames prior to the subsequent Vsync time, where the set of second frames is subsequent to the first frame, as described in connection with the examples in FIGS. 1-10. For example, as described in 1060 of FIG. 10, CPU 1002 may transmit, based on the margin time period, a first indication of a subsequent frame transfer interrupt time, where the subsequent frame transfer interrupt time is associated with a starting time to transfer a set of second frames prior to the subsequent Vsync time, where the set of second frames is subsequent to the first frame. Further, step 1112 may be performed by processing unit 120 in FIG. 1. Also, the first indication of the subsequent frame transfer interrupt time may be transmitted to the DPU. In some aspects, transmitting the first indication of the subsequent frame transfer interrupt time may include: programming the DPU to generate the subsequent frame transfer interrupt time prior to the subsequent Vsync time. That is, the CPU may program the DPU to generate the subsequent frame transfer interrupt time prior to the subsequent Vsync time.

At 1114, the CPU may transmit, to a display processing unit (DPU), a second indication to transfer the set of second frames at a reduced DPU clock frequency and a reduced bandwidth starting at the subsequent frame transfer interrupt time, as described in connection with the examples in FIGS. 1-10. For example, as described in 1070 of FIG. 10, CPU 1002 may transmit, to a display processing unit (DPU), a second indication to transfer the set of second frames at a reduced DPU clock frequency and a reduced bandwidth starting at the subsequent frame transfer interrupt time. Further, step 1114 may be performed by processing unit 120 in FIG. 1. The transfer of the set of second frames at the reduced DPU clock frequency and the reduced bandwidth may correspond to an amortization of a pixel transfer for the set of second frames. Also, the DPU may be programmed to transfer the set of second frames at a subsequent frame programming time. In some aspects, transmitting the second indication to transfer the set of second frames at the reduced DPU clock frequency and the reduced bandwidth may include: programming the DPU to transfer the set of second frames at the reduced DPU clock frequency and the reduced bandwidth. That is, the CPU may program the DPU to transfer the set of second frames at the reduced DPU clock frequency and the reduced bandwidth. In some aspects, the second indication to transfer the set of second frames may be generated by at least one of: a central processing unit (CPU) or DPU driver software. Also, the DPU may include at least one of: DPU hardware or at least one display processor. In some instances, the set of second frames may be transferred at the reduced DPU clock frequency and the reduced bandwidth until an adjustment in a panel ROI for the set of second frames.

Figure 12:
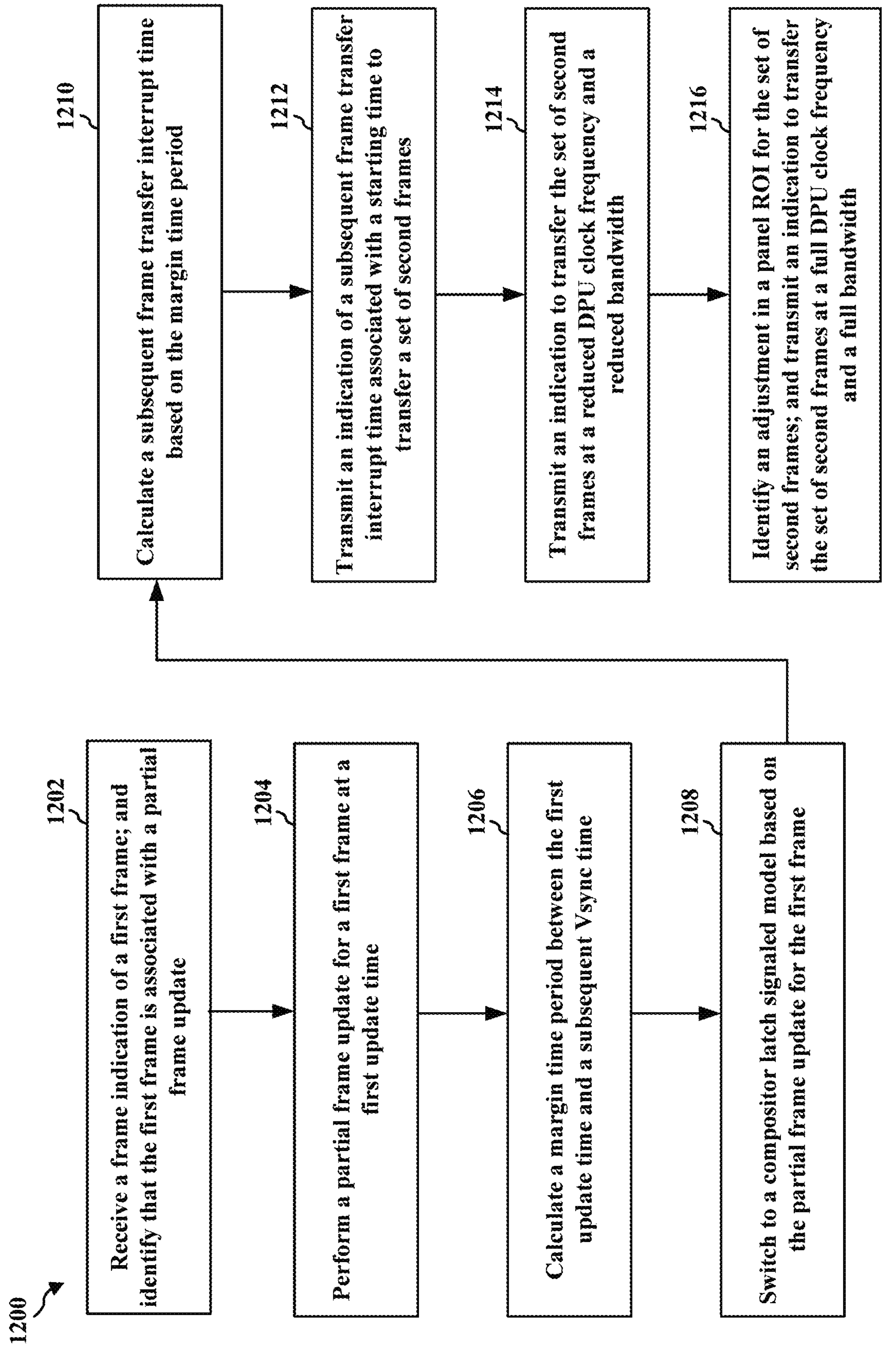
FIG. 12 is a flowchart of an example method of display processing.

FIG. 12 is a flowchart 1200 of an example method of display processing in accordance with one or more techniques of this disclosure. The method may be performed by a CPU (or other central processor), a DPU driver, a DPU (or other display processor), a GPU (or other graphics processor), a DDIC, an apparatus for display processing, a wireless communication device, and/or any apparatus that may perform display processing as used in connection with the examples of FIGS. 1-10.

At 1202, the CPU may receive a frame indication of a first frame prior to a partial frame update for the first frame, as described in connection with the examples in FIGS. 1-10. For example, as described in 1010 of FIG. 10, CPU 1002 may receive a frame indication of a first frame prior to a partial frame update for the first frame. Further, step 1202 may be performed by processing unit 120 in FIG. 1.

Also, at 1202, the CPU may identify that the first frame is associated with the partial frame update, as described in connection with the examples in FIGS. 1-10. For example, as described in 1010 of FIG. 10, CPU 1002 may identify that the first frame is associated with the partial frame update. Further, step 1202 may be performed by processing unit 120 in FIG. 1.

At 1204, the CPU may perform a partial frame update for a first frame at a first update time, where the partial frame update corresponds to an update of less than all content in the first frame, where the partial frame update for the first frame is associated with a panel region of interest (ROI) of the first frame, as described in connection with the examples in FIGS. 1-10. For example, as described in 1020 of FIG. 10, CPU 1002 may perform a partial frame update for a first frame at a first update time, where the partial frame update corresponds to an update of less than all content in the first frame, where the partial frame update for the first frame is associated with a panel region of interest (ROI) of the first frame. Further, step 1204 may be performed by processing unit 120 in FIG. 1. In some aspects, the partial frame update for the first frame may be performed with a full DPU clock frequency and a full bandwidth.

At 1206, the CPU may calculate a margin time period between the first update time and a subsequent vertical synchronization (Vsync) time, as described in connection with the examples in FIGS. 1-10. For example, as described in 1030 of FIG. 10, CPU 1002 may calculate a margin time period between the first update time and a subsequent vertical synchronization (Vsync) time. Further, step 1206 may be performed by processing unit 120 in FIG. 1. In some aspects, calculating the margin time period between the first update time and the subsequent Vsync time may include: generating one or more software duration heuristics; and predicting one or more composition timelines for a panel ROI of the set of second frames. That is, the CPU may generate one or more software duration heuristics; and predict one or more composition timelines for a panel ROI of the set of second frames.

At 1208, the CPU may switch to a compositor latch signaled model based on the partial frame update for the first frame, where the compositor latch signaled model is a software model associated with an immediate consumption of a frame by the DPU, as described in connection with the examples in FIGS. 1-10. For example, as described in 1040 of FIG. 10, CPU 1002 may switch to a compositor latch signaled model based on the partial frame update for the first frame, where the compositor latch signaled model is a software model associated with an immediate consumption of a frame by the DPU. Further, step 1208 may be performed by processing unit 120 in FIG. 1.

At 1210, the CPU may calculate the subsequent frame transfer interrupt time based on the margin time period between the first update time and the subsequent Vsync time, as described in connection with the examples in FIGS. 1-10. For example, as described in 1050 of FIG. 10, CPU 1002 may calculate the subsequent frame transfer interrupt time based on the margin time period between the first update time and the subsequent Vsync time. Further, step 1210 may be performed by processing unit 120 in FIG. 1.

At 1212, the CPU may transmit, based on the margin time period, a first indication of a subsequent frame transfer interrupt time, where the subsequent frame transfer interrupt time is associated with a starting time to transfer a set of second frames prior to the subsequent Vsync time, where the set of second frames is subsequent to the first frame, as described in connection with the examples in FIGS. 1-10. For example, as described in 1060 of FIG. 10, CPU 1002 may transmit, based on the margin time period, a first indication of a subsequent frame transfer interrupt time, where the subsequent frame transfer interrupt time is associated with a starting time to transfer a set of second frames prior to the subsequent Vsync time, where the set of second frames is subsequent to the first frame. Further, step 1212 may be performed by processing unit 120 in FIG. 1. Also, the first indication of the subsequent frame transfer interrupt time may be transmitted to the DPU. In some aspects, transmitting the first indication of the subsequent frame transfer interrupt time may include: programming the DPU to generate the subsequent frame transfer interrupt time prior to the subsequent Vsync time. That is, the CPU may program the DPU to generate the subsequent frame transfer interrupt time prior to the subsequent Vsync time.

At 1214, the CPU may transmit, to a display processing unit (DPU), a second indication to transfer the set of second frames at a reduced DPU clock frequency and a reduced bandwidth starting at the subsequent frame transfer interrupt time, as described in connection with the examples in FIGS. 1-10. For example, as described in 1070 of FIG. 10, CPU 1002 may transmit, to a display processing unit (DPU), a second indication to transfer the set of second frames at a reduced DPU clock frequency and a reduced bandwidth starting at the subsequent frame transfer interrupt time. Further, step 1214 may be performed by processing unit 120 in FIG. 1. The transfer of the set of second frames at the reduced DPU clock frequency and the reduced bandwidth may correspond to an amortization of a pixel transfer for the set of second frames. Also, the DPU may be programmed to transfer the set of second frames at a subsequent frame programming time. In some aspects, transmitting the second indication to transfer the set of second frames at the reduced DPU clock frequency and the reduced bandwidth may include: programming the DPU to transfer the set of second frames at the reduced DPU clock frequency and the reduced bandwidth. That is, the CPU may program the DPU to transfer the set of second frames at the reduced DPU clock frequency and the reduced bandwidth. In some aspects, the second indication to transfer the set of second frames may be generated by at least one of: a central processing unit (CPU) or DPU driver software. Also, the DPU may include at least one of: DPU hardware or at least one display processor. In some instances, the set of second frames may be transferred at the reduced DPU clock frequency and the reduced bandwidth until an adjustment in a panel ROI for the set of second frames.

At 1216, the CPU may identify an adjustment in a panel ROI for the set of second frames, as described in connection with the examples in FIGS. 1-10. For example, as described in 1080 of FIG. 10, CPU 1002 may identify an adjustment in a panel ROI for the set of second frames. Further, step 1216 may be performed by processing unit 120 in FIG. 1.

Also, at 1216, the CPU may transmit, to the DPU, a third indication to transfer the set of second frames at a full DPU clock frequency and a full bandwidth frequency based on the adjustment in the panel ROI for the set of second frames, as described in connection with the examples in FIGS. 1-10. For example, as described in 1080 of FIG. 10, CPU 1002 may transmit, to the DPU, a third indication to transfer the set of second frames at a full DPU clock frequency and a full bandwidth based on the adjustment in the panel ROI for the set of second frames, as described in connection with the examples in FIGS. 1-10. For example, as described in 1080 of FIG. 10, CPU 1002 may transmit, to the DPU, a third indication to transfer the set of second frames at a full DPU clock frequency and a full bandwidth based on the adjustment in the panel ROI for the set of second frames. Further, step 1216 may be performed by processing unit 120 in FIG. 1. The third indication may be transmitted to the DPU at the subsequent Vsync time. In some aspects, transmitting the third indication to transfer the set of second frames at the full DPU clock frequency and the full bandwidth may include: reprogramming the DPU to transfer the set of second frames at the full DPU clock frequency and the full bandwidth. That is, the CPU may reprogram the DPU to transfer the set of second frames at the full DPU clock frequency and the full bandwidth.

In configurations, a method or an apparatus for display processing is provided. The apparatus may be a CPU (or other central processor), a DPU (or other display processor), a GPU (or other graphics processor), a DPU driver, a DDIC, an apparatus for display processing, and/or some other processor that may perform display processing. In aspects, the apparatus may be the processing unit 120 within the device 104, or may be some other hardware within the device 104 or another device. The apparatus, e.g., processing unit 120, may include means for performing a partial frame update for a first frame at a first update time, where the partial frame update corresponds to an update of less than all content in the first frame, where the partial frame update for the first frame is associated with a panel region of interest (ROI) of the first frame. The apparatus, e.g., processing unit 120, may also include means for calculating a margin time period between the first update time and a subsequent vertical synchronization (Vsync) time. The apparatus, e.g., processing unit 120, may also include means for transmitting, based on the margin time period, a first indication of a subsequent frame transfer interrupt time, where the subsequent frame transfer interrupt time is associated with a starting time to transfer a set of second frames prior to the subsequent Vsync time, where the set of second frames is subsequent to the first frame. The apparatus, e.g., processing unit 120, may also include means for transmitting, to a display processing unit (DPU), a second indication to transfer the set of second frames at a reduced DPU clock frequency and a reduced bandwidth starting at the subsequent frame transfer interrupt time. The apparatus, e.g., processing unit 120, may also include means for identifying an adjustment in a panel ROI for the set of second frames. The apparatus, e.g., processing unit 120, may also include means for transmitting, to the DPU, a third indication to transfer the set of second frames at a full DPU clock frequency and a full bandwidth based on the adjustment in the panel ROI for the set of second frames. The apparatus, e.g., processing unit 120, may also include means for switching to a compositor latch signaled model based on the partial frame update for the first frame, where the compositor latch signaled model is a software model associated with an immediate consumption of a frame by the DPU. The apparatus, e.g., processing unit 120, may also include means for calculating the subsequent frame transfer interrupt time based on the margin time period between the first update time and the subsequent Vsync time. The apparatus, e.g., processing unit 120, may also include means for receiving a frame indication of the first frame prior to the partial frame update for the first frame. The apparatus, e.g., processing unit 120, may also include means for identifying that the first frame is associated with the partial frame update.

The subject matter described herein may be implemented to realize one or more benefits or advantages. For instance, the described display processing techniques may be used by a CPU, a central processor, a DPU driver, a DPU, a display processor, a GPU, or some other processor that may perform display processing to implement the partial frame update techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize partial frame update techniques in order to improve memory bandwidth efficiency and/or increase processing speed at a CPU, a DPU or a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing, including a memory and at least one processor coupled to the memory and, based at least in part on information stored in the memory, the at least one processor is configured to: perform a partial frame update for a first frame at a first update time, where the partial frame update corresponds to an update of less than all content in the first frame, where the partial frame update for the first frame is associated with a panel region of interest (ROI) of the first frame; calculate a margin time period between the first update time and a subsequent vertical synchronization (Vsync) time; transmit, based on the margin time period, a first indication of a subsequent frame transfer interrupt time, where the subsequent frame transfer interrupt time is associated with a starting time to transfer a set of second frames prior to the subsequent Vsync time, where the set of second frames is subsequent to the first frame; and transmit, to a display processing unit (DPU), a second indication to transfer the set of second frames at a reduced DPU clock frequency and a reduced bandwidth starting at the subsequent frame transfer interrupt time.

Aspect 2 is the apparatus of aspect 1, where the at least one processor is further configured to: identify an adjustment in a panel ROI for the set of second frames; and transmit, to the DPU, a third indication to transfer the set of second frames at a full DPU clock frequency and a full bandwidth based on the adjustment in the panel ROI for the set of second frames.

Aspect 3 is the apparatus of aspect 2, where to transmit the third indication to transfer the set of second frames at the full DPU clock frequency and the full bandwidth frequency, the at least one processor is configured to: reprogram the DPU to transfer the set of second frames at the full DPU clock frequency and the full bandwidth.

Aspect 4 is the apparatus of any of aspects 2 to 3, where to transmit the third indication, the at least one processor is configured to: transmit the third indication to the DPU at the subsequent Vsync time.

Aspect 5 is the apparatus of any of aspects 1 to 4, where to calculate the margin time period between the first update time and the subsequent Vsync time, the at least one processor is configured to: generate one or more software duration heuristics; and predict one or more composition timelines for a panel ROI of the set of second frames.

Aspect 6 is the apparatus of any of aspects 1 to 5, where the at least one processor is further configured to: switch to a compositor latch signaled model based on the partial frame update for the first frame, where the compositor latch signaled model is a software model associated with an immediate consumption of a frame by the DPU.

Aspect 7 is the apparatus of any of aspects 1 to 6, where the at least one processor is further configured to: calculate the subsequent frame transfer interrupt time based on the margin time period between the first update time and the subsequent Vsync time.

Aspect 8 is the apparatus of any of aspects 1 to 7, where to transmit the first indication of the subsequent frame transfer interrupt time, the at least one processor is configured to: program the DPU to generate the subsequent frame transfer interrupt time prior to the subsequent Vsync time.

Aspect 9 is the apparatus of any of aspects 1 to 8, where the transfer of the set of second frames at the reduced DPU clock frequency and the reduced bandwidth corresponds to an amortization of a pixel transfer for the set of second frames.

Aspect 10 is the apparatus of any of aspects 1 to 9, where to transmit the second indication to transfer the set of second frames at the reduced DPU clock frequency and the reduced bandwidth, the at least one processor is configured to: program the DPU to transfer the set of second frames at the reduced DPU clock frequency and the reduced bandwidth.

Aspect 11 is the apparatus of aspect 10, where the at least one processor is configured to program the DPU to transfer the set of second frames at a subsequent frame programming time.

Aspect 12 is the apparatus of any of aspects 1 to 11, where the at least one processor is further configured to: receive a frame indication of the first frame prior to the partial frame update for the first frame; and identify that the first frame is associated with the partial frame update.

Aspect 13 is the apparatus of any of aspects 1 to 12, where to transmit the first indication of the subsequent frame transfer interrupt time, the at least one processor is configured to: transmit the first indication of the subsequent frame transfer interrupt time to the DPU.

Aspect 14 is the apparatus of any of aspects 1 to 13, where the partial frame update for the first frame is configured to be performed with a full DPU clock frequency and a full bandwidth.

Aspect 15 is the apparatus of any of aspects 1 to 14, where the second indication to transfer the set of second frames is configured to be generated by at least one of: a central processing unit (CPU) or DPU driver software, and where the DPU includes at least one of: DPU hardware or at least one display processor.

Aspect 16 is the apparatus of any of aspects 1 to 15, further including at least one of an antenna or a transceiver coupled to the at least one processor, where to transmit the second indication, the at least one processor is configured to transmit the second indication via at least one of the antenna or the transceiver, and where the set of second frames is configured to be transferred at the reduced DPU clock frequency and the reduced bandwidth until an adjustment in a panel ROI for the set of second frames.

Aspect 17 is a method of display processing for implementing any of aspects 1 to 16.

Aspect 18 is an apparatus for display processing including means for implementing any of aspects 1 to 16.

Aspect 19 is a computer-readable medium (e.g., a non-transitory computer-readable medium) storing computer executable code, the code when executed by at least one processor causes the at least one processor to implement any of aspects 1 to 16.

What is claimed is:

1. An apparatus for display processing, comprising:
memory; and
at least one processor coupled to the memory and, based at least in part on information stored in the memory, the at least one processor is configured to:
perform a partial frame update for a first frame at a first update time, wherein the partial frame update corresponds to an update of less than all content in the first frame, and wherein the partial frame update for the first frame is associated with a panel region of interest (ROI) of the first frame;
calculate a margin time period between the first update time and a subsequent vertical synchronization (Vsync) time;
transmit, based on the margin time period, a first indication of a subsequent frame transfer interrupt time, wherein the subsequent frame transfer interrupt time is associated with a starting time to transfer a set of second frames prior to the subsequent Vsync time, and wherein the set of second frames is subsequent to the first frame; and
transmit, to a display processing unit (DPU), a second indication to transfer the set of second frames at a reduced DPU clock frequency and a reduced bandwidth starting at the subsequent frame transfer interrupt time,
wherein power consumption is optimized by transferring frames at the reduced DPU clock frequency and the reduced bandwidth for static portions of the frames.

2. The apparatus of claim 1, wherein the at least one processor is further configured to:
identify an adjustment in a panel ROI for the set of second frames; and
transmit, to the DPU, a third indication to transfer the set of second frames at a full DPU clock frequency and a full bandwidth based on the adjustment in the panel ROI for the set of second frames.

3. The apparatus of claim 2, wherein to transmit the third indication to transfer the set of second frames at the full DPU clock frequency and the full bandwidth, the at least one processor is configured to:
reprogram the DPU to transfer the set of second frames at the full DPU clock frequency and the full bandwidth.

4. The apparatus of claim 2, wherein to transmit the third indication, the at least one processor is configured to:
transmit the third indication to the DPU at the subsequent Vsync time.

5. The apparatus of claim 1, wherein to calculate the margin time period between the first update time and the subsequent Vsync time, the at least one processor is configured to:
generate one or more software duration heuristics; and
predict one or more composition timelines for a panel ROI of the set of second frames.

6. The apparatus of claim 1, wherein the at least one processor is further configured to:
switch to a compositor latch signaled model based on the partial frame update for the first frame, and wherein the compositor latch signaled model is a software model associated with an immediate consumption of a frame by the DPU.

7. The apparatus of claim 1, wherein the at least one processor is further configured to:
calculate the subsequent frame transfer interrupt time based on the margin time period between the first update time and the subsequent Vsync time.

8. The apparatus of claim 1, wherein to transmit the first indication of the subsequent frame transfer interrupt time, the at least one processor is configured to:
program the DPU to generate the subsequent frame transfer interrupt time prior to the subsequent Vsync time.

9. The apparatus of claim 1, wherein the transfer of the set of second frames at the reduced DPU clock frequency and the reduced bandwidth corresponds to an amortization of a pixel transfer for the set of second frames.

10. The apparatus of claim 1, wherein to transmit the second indication to transfer the set of second frames at the reduced DPU clock frequency and the reduced frequency, the at least one processor is configured to:
program the DPU to transfer the set of second frames at the reduced DPU clock frequency and the reduced bandwidth.

11. The apparatus of claim 10, wherein the at least one processor is configured to:

program the DPU to transfer the set of second frames at a subsequent frame programming time.

12. The apparatus of claim 1, wherein the at least one processor is further configured to:

receive a frame indication of the first frame prior to the partial frame update for the first frame; and identify that the first frame is associated with the partial frame update.

13. The apparatus of claim 1, wherein to transmit the first indication of the subsequent frame transfer interrupt time, the at least one processor is configured to: transmit the first indication of the subsequent frame transfer interrupt time to the DPU.

14. The apparatus of claim 1, wherein the partial frame update for the first frame is configured to:

be performed with a full DPU clock frequency and a full bandwidth.

15. The apparatus of claim 1, wherein the second indication to transfer the set of second frames is configured to:

be generated by a central processing unit (CPU), and wherein the DPU includes DPU hardware.

16. The apparatus of claim 1, further comprising:

a transceiver coupled to the at least one processor, wherein to transmit the second indication, the at least one processor is configured to transmit the second indication via the transceiver, and wherein the set of second frames is configured to be transferred at the reduced DPU clock frequency and the reduced frequency until an adjustment in a panel ROI for the set of second frames.

17. An apparatus for display processing, comprising:

means for performing a partial frame update for a first frame at a first update time, wherein the partial frame update corresponds to an update of less than all content in the first frame, wherein the partial frame update for the first frame is associated with a panel region of interest (ROI) of the first frame;

means for calculating a margin time period between the first update time and a subsequent vertical synchronization (Vsync) time;

means for transmitting, based on the margin time period, a first indication of a subsequent frame transfer interrupt time, wherein the subsequent frame transfer interrupt time is associated with a starting time to transfer a set of second frames prior to the subsequent Vsync time, wherein the set of second frames is subsequent to the first frame; and means for transmitting, to a display processing unit (DPU), a second indication to transfer the set of second frames at a reduced DPU clock frequency and a reduced bandwidth starting at the subsequent frame transfer interrupt time, wherein power consumption is optimized by transferring frames at the reduced DPU clock frequency and the reduced bandwidth for static portions of the frames.

18. A method of display processing, comprising:

performing a partial frame update for a first frame at a first update time, wherein the partial frame update corresponds to an update of less than all content in the first frame, wherein the partial frame update for the first frame is associated with a panel region of interest (ROI) of the first frame;

calculating a margin time period between the first update time and a subsequent vertical synchronization (Vsync) time;

transmitting, based on the margin time period, a first indication of a subsequent frame transfer interrupt time, wherein the subsequent frame transfer interrupt time is associated with a starting time to transfer a set of second frames prior to the subsequent Vsync time, wherein the set of second frames is subsequent to the first frame; and transmitting, to a display processing unit (DPU), a second indication to transfer the set of second frames at a reduced DPU clock frequency and a reduced bandwidth starting at the subsequent frame transfer interrupt time, wherein power consumption is optimized by transferring frames at the reduced DPU clock frequency and the reduced bandwidth for static portions of the frames.

19. The method of claim 18, further comprising:

identifying an adjustment in a panel ROI for the set of second frames; and transmitting, to the DPU, a third indication to transfer the set of second frames at a full DPU clock frequency and a full bandwidth based on the adjustment in the panel ROI for the set of second frames.

20. The method of claim 19, wherein transmitting the third indication to transfer the set of second frames at the full DPU clock frequency and the full bandwidth comprises:

reprogramming the DPU to transfer the set of second frames at the full DPU clock frequency and the full bandwidth, and wherein the third indication is transmitted to the DPU at the subsequent Vsync time.

21. The method of claim 18, wherein calculating the margin time period between the first update time and the subsequent Vsync time comprises:

generating one or more software duration heuristics; and predicting one or more composition timelines for a panel ROI of the set of second frames.

22. The method of claim 18, further comprising:

switching to a compositor latch signaled model based on the partial frame update for the first frame, wherein the compositor latch signaled model is a software model associated with an immediate consumption of a frame by the DPU.

23. The method of claim 18, further comprising:

calculating the subsequent frame transfer interrupt time based on the margin time period between the first update time and the subsequent Vsync time.

24. The method of claim 18, wherein transmitting the first indication of the subsequent frame transfer interrupt time comprises:

programming the DPU to generate the subsequent frame transfer interrupt time prior to the subsequent Vsync time.

25. The method of claim 18, wherein the transfer of the set of second frames at the reduced DPU clock frequency and the reduced bandwidth corresponds to an amortization of a pixel transfer for the set of second frames.

26. The method of claim 18, wherein transmitting the second indication to transfer the set of second frames at the reduced DPU clock frequency and the reduced bandwidth comprises:

programming the DPU to transfer the set of second frames at the reduced DPU clock frequency and the reduced bandwidth, and wherein the DPU is programmed to transfer the set of second frames at a subsequent frame programming time.

27. The method of claim 18, further comprising:
receiving a frame indication of the first frame prior to the partial frame update for the first frame; and
identifying that the first frame is associated with the partial frame update.

28. The method of claim 18,
wherein the first indication of the subsequent frame transfer interrupt time is transmitted to the DPU, and
wherein the partial frame update for the first frame is performed with a full DPU clock frequency and a full bandwidth.

29. The method of claim 18,
wherein the second indication to transfer the set of second frames is generated by a central processing unit (CPU),
wherein the DPU includes DPU hardware, and
wherein the set of second frames is transferred at the reduced DPU clock frequency and the reduced bandwidth until an adjustment in a panel ROI for the set of second frames.

30. A non-transitory computer-readable medium storing computer executable code for display processing, the code when executed by a processor causes the processor to:
perform a partial frame update for a first frame at a first update time, wherein the partial frame update corresponds to an update of less than all content in the first frame, wherein the partial frame update for the first frame is associated with a panel region of interest (ROI) of the first frame;
calculate a margin time period between the first update time and a subsequent vertical synchronization (Vsync) time;
transmit, based on the margin time period, a first indication of a subsequent frame transfer interrupt time, wherein the subsequent frame transfer interrupt time is associated with a starting time to transfer a set of second frames prior to the subsequent Vsync time, wherein the set of second frames is subsequent to the first frame; and
transmit, to a display processing unit (DPU), a second indication to transfer the set of second frames at a reduced DPU clock frequency and a reduced bandwidth starting at the subsequent frame transfer interrupt time,
wherein power consumption is optimized by transferring frames at the reduced DPU clock frequency and the reduced bandwidth for static portions of the frames.

* * * * *